US011228931B2

(12) United States Patent
Zhou et al.

(10) Patent No.: US 11,228,931 B2
(45) Date of Patent: Jan. 18, 2022

(54) ON-DEMAND PHYSICAL LAYER REPORTING BY A UE

(71) Applicant: QUALCOMM Incorporated, San Diego, CA (US)

(72) Inventors: Yan Zhou, San Diego, CA (US); Tao Luo, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 16/452,192

(22) Filed: Jun. 25, 2019

(65) Prior Publication Data
US 2020/0053584 A1    Feb. 13, 2020

Related U.S. Application Data

(60) Provisional application No. 62/717,570, filed on Aug. 10, 2018.

(51) Int. Cl.
*H04W 24/10* (2009.01)
*H04W 74/08* (2009.01)
*H04W 88/08* (2009.01)

(52) U.S. Cl.
CPC ....... *H04W 24/10* (2013.01); *H04W 74/0833* (2013.01); *H04W 88/08* (2013.01)

(58) Field of Classification Search
CPC . H04W 24/10; H04W 74/0833; H04W 88/08; H04W 17/309; H04W 5/0035; H04W 5/001; H04W 76/15; H04W 74/006; H04W 36/0094; H04W 36/0069
See application file for complete search history.

(56) References Cited

U.S. PATENT DOCUMENTS

| | | | | |
|---|---|---|---|---|
| 8,593,990 | B1* | 11/2013 | Henttonen | ...... H04W 36/00835 370/252 |
| 9,730,090 | B2* | 8/2017 | Johansson | ............. H04W 24/04 |
| 10,772,008 | B2* | 9/2020 | Park | ......................... H04L 1/08 |

(Continued)

FOREIGN PATENT DOCUMENTS

| | | | | |
|---|---|---|---|---|
| EP | 2911449 A1 * | 8/2015 | ........ H04W 72/0446 |
| EP | 2949063 A1 | 12/2015 | |

(Continued)

OTHER PUBLICATIONS

International Search Report and Written Opinion—PCT/US2019/039300—ISA/EPO—dated Sep. 30, 2019.

*Primary Examiner* — Jay P Patel
(74) *Attorney, Agent, or Firm* — Danai Nelisile Mhembere; Holland & Hart LLP

(57) ABSTRACT

Methods, systems, and devices for wireless communications are described. A first base station may transmit a request for a user equipment (UE) to provide a physical layer report for a second base station. The second base station may be a base station of a dual connectivity configuration, a deactivated base station of the carrier aggregation configuration, or a non-serving base station of the UE. The UE may measure transmissions of the second base station and generate, at the physical layer of the UE, a physical layer report based on the measurements. The UE may transmit the physical layer report to the first base station.

29 Claims, 18 Drawing Sheets

(56) References Cited

U.S. PATENT DOCUMENTS

| | | | |
|---|---|---|---|
| 2012/0258729 A1* | 10/2012 | Siomina | G01S 5/0215 |
| | | | 455/456.1 |
| 2014/0038609 A1* | 2/2014 | Henttonen | H04W 36/0094 |
| | | | 455/436 |
| 2017/0311200 A1* | 10/2017 | Koskinen | H04W 72/042 |
| 2017/0331577 A1* | 11/2017 | Parkvall | H04J 11/0079 |
| 2017/0331670 A1* | 11/2017 | Parkvall | H04W 24/10 |
| 2017/0359746 A1* | 12/2017 | Lee | H04L 5/0044 |
| 2018/0192426 A1* | 7/2018 | Ryoo | H04W 72/085 |
| 2018/0199328 A1* | 7/2018 | Sang | H04W 36/06 |
| 2018/0317114 A1* | 11/2018 | Kim | H04L 1/1685 |
| 2019/0058508 A1* | 2/2019 | Yiu | H04B 7/0857 |
| 2019/0089579 A1* | 3/2019 | Sang | H04W 36/305 |
| 2019/0098655 A1* | 3/2019 | Shih | H04W 74/0833 |
| 2019/0215726 A1* | 7/2019 | Park | H04W 24/10 |
| 2019/0281587 A1* | 9/2019 | Zhang | H04L 5/0044 |
| 2019/0297537 A1* | 9/2019 | Tsai | H04W 76/27 |
| 2019/0297547 A1* | 9/2019 | Tsai | H04L 5/0048 |
| 2019/0380114 A1* | 12/2019 | Yokomakura | H04L 5/0057 |
| 2020/0029235 A1* | 1/2020 | Yokomakura | H04L 1/0026 |
| 2020/0029316 A1* | 1/2020 | Zhou | H04W 74/0833 |
| 2020/0137701 A1* | 4/2020 | Harada | H04W 56/0045 |
| 2020/0169906 A1* | 5/2020 | Tsuboi | H04W 80/08 |
| 2020/0245388 A1* | 7/2020 | Byun | H04W 76/15 |
| 2020/0305213 A1* | 9/2020 | Teyeb | H04W 72/1242 |
| 2020/0336954 A1* | 10/2020 | Park | H04W 24/10 |
| 2020/0351971 A1* | 11/2020 | Fiorani | H04B 17/318 |
| 2020/0359251 A1* | 11/2020 | Gunnarsson | H04W 56/007 |
| 2020/0382469 A1* | 12/2020 | Rocquelay | H04L 63/166 |

FOREIGN PATENT DOCUMENTS

| | | | | |
|---|---|---|---|---|
| WO | WO-2011100673 A1 * | 8/2011 | | H04W 52/146 |
| WO | WO-2012096607 A1 * | 7/2012 | | G01S 5/0215 |
| WO | WO-2014019123 A1 * | 2/2014 | | H04W 36/24 |

* cited by examiner

ON-DEMAND PHYSICAL LAYER REPORTING BY A UE

CROSS REFERENCE

The present Application for Patent claims the benefit of U.S. Provisional Patent Application No. 62/717,570 by ZHOU et al., entitled "ON-DEMAND PHYSICAL LAYER REPORTING BY A UE," filed Aug. 10, 2018, assigned to the assignee hereof, and expressly incorporated by reference herein.

BACKGROUND

The following relates generally to wireless communications, and more specifically to on-demand physical layer reporting by a user equipment (UE).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communication systems may operate in coordinated configurations. For example, some wireless communication systems may operate in a dual connectivity (DC) configuration. In a DC configuration, a UE may receive data from multiple cell groups via a master base station and one or more secondary base stations. In another example, some wireless communication systems may operate in a carrier aggregation (CA) configuration. In a CA configuration, a UE may receive data on multiple component carriers from one or more base stations.

SUMMARY

The described techniques relate to improved methods, systems, devices, and apparatuses that support physical layer reporting for dual-connectivity (DC) or carrier aggregation (CA) configurations, as well as for non-serving (e.g., neighbor) cells. Generally, the described techniques provide for a user equipment (UE) to generate and transmit a physical layer report for the UE in such configurations. For example, a base station may request that a UE provide a physical layer report for a second base station. The second base station may be a base station containing a DC configuration with the first base station, a deactivated base station of a CA configuration with the first base station, or a non-serving base station of the UE (e.g., a neighboring base station). The UE may measure parameters of transmissions from the second base station. The UE may generate a physical layer report at a physical layer of the UE, and may transmit the physical layer report to the primary base station via the physical layer of the UE. In some cases, based on the physical layer report, the primary base station may determine whether to instruct the UE to initiate communications or conduct a random access channel procedure with the second base station. As a physical layer report may have shortened processing and transmission time in comparison to higher layer reports (e.g., Radio Resource Control (RRC) reports), latency within a coordinated configuration may be reduced.

A method of wireless communication at a user equipment (UE) is described. The method may include receiving, from a first base station, a request to provide a physical layer report for a second base station, where the second base station is a base station in a dual-connectivity (DC) configuration, a deactivated base station in a carrier aggregation (CA) configuration, or a non-serving base station of the UE, measuring a set of physical layer parameters associated with a set of transmissions from the second base station, the measuring based on the request, generating the physical layer report based on the measured set of parameters, and transmitting, via a physical layer message, the physical layer report to the first base station in response to the request.

An apparatus for wireless communication at a UE is described. The apparatus may include a processor, memory in electronic communication with the processor, and instructions stored in the memory. The instructions may be executable by the processor to cause the apparatus to receive, from a first base station, a request to provide a physical layer report for a second base station, where the second base station is a base station in a DC configuration, a deactivated base station in a CA configuration, or a non-serving base station of the UE, measure a set of physical layer parameters associated with a set of transmissions from the second base station, the measuring based on the request, generate the physical layer report based on the measured set of parameters, and transmit, via a physical layer message, the physical layer report to the first base station in response to the request.

Another apparatus for wireless communication at a UE is described. The apparatus may include means for receiving, from a first base station, a request to provide a physical layer report for a second base station, where the second base station is a base station in a DC configuration, a deactivated base station in a CA configuration, or a non-serving base station of the UE, measuring a set of physical layer parameters associated with a set of transmissions from the second base station, the measuring based on the request, generating the physical layer report based on the measured set of parameters, and transmitting, via a physical layer message, the physical layer report to the first base station in response to the request.

A non-transitory computer-readable medium storing code for wireless communication at a UE is described. The code may include instructions executable by a processor to receive, from a first base station, a request to provide a physical layer report for a second base station, where the second base station is a base station in a DC configuration, a deactivated base station in a CA configuration, or a non-serving base station of the UE, measure a set of physical layer parameters associated with a set of transmissions from the second base station, the measuring based on the request, generate the physical layer report based on the measured set of parameters, and transmit, via a physical layer message, the physical layer report to the first base station in response to the request.

Some examples of the method, apparatuses, and non-transitory computer-readable medium described herein may further include operations, features, means, or instructions for receiving, from the first base station, a request to provide a Radio Resource Control (RRC) layer report for the second base station, measuring another set of parameters associated with another set of transmissions from the second base station, generating the RRC layer report based on the measured another set of parameters and transmitting, via an RRC message, the RRC layer report to the first base station in response to the request to provide the RRC layer report for the second base station, where receiving the request to provide the physical layer report for the second base station may be based on transmitting the RRC layer report.

Some examples of the method, apparatuses, and non-transitory computer-readable medium described herein may further include operations, features, means, or instructions for identifying a window for measuring the set of transmissions from the second base station based on the request to provide the physical layer report for the second base station.

In some examples of the method, apparatuses, and non-transitory computer-readable medium described herein, the physical layer report includes information on a measured cell identifier (ID), a reference signal type, a reference signal ID, a channel state information reference signal (CSI-RS) resource ID, a synchronization signal index, a rank indicator, a precoding matrix index, a channel quality indicator (CQI), a reference signal receive power (RSRP), or a combination thereof.

In some examples of the method, apparatuses, and non-transitory computer-readable medium described herein, the second base station may be the base station in the DC configuration. In some examples of the method, apparatuses, and non-transitory computer-readable medium described herein, the set of transmissions from the second base station includes one or more synchronization signal blocks (SSBs).

Some examples of the method, apparatuses, and non-transitory computer-readable medium described herein may further include operations, features, means, or instructions for receiving, from the first base station, an indication that the second base station may be added to the DC configuration prior to measuring the set of physical layer parameters. Some examples of the method, apparatuses, and non-transitory computer-readable medium described herein may further include operations, features, means, or instructions for receiving a random access configuration message from the first base station based on the physical layer report.

Some examples of the method, apparatuses, and non-transitory computer-readable medium described herein may further include operations, features, means, or instructions for performing a random access channel procedure with the second base station based on the random access configuration message.

In some examples of the method, apparatuses, and non-transitory computer-readable medium described herein, the second base station may be the deactivated base station in the CA configuration. In some examples of the method, apparatuses, and non-transitory computer-readable medium described herein, the set of transmissions from the second base station includes one or more aperiodic channel state information (A-CSI) reference signals (A-CSI-RS).

Some examples of the method, apparatuses, and non-transitory computer-readable medium described herein may further include operations, features, means, or instructions for receiving a cell activation message from the first base station based on the physical layer report, where the cell activation message indicates the second base station may be activated for communications. Some examples of the method, apparatuses, and non-transitory computer-readable medium described herein may further include operations, features, means, or instructions for communicating with the second base station based at least in part on the cell activation message.

In some examples of the method, apparatuses, and non-transitory computer-readable medium described herein, the second base station may be the non-serving base station of the UE. Some examples of the method, apparatuses, and non-transitory computer-readable medium described herein may further include operations, features, means, or instructions for receiving, from the first base station, an indication that the second base station may be added as a primary secondary base station.

Some examples of the method, apparatuses, and non-transitory computer-readable medium described herein may further include operations, features, means, or instructions for performing a random access channel procedure with the second base station based on the indication.

A method of wireless communication at a first base station is described. The method may include transmitting, to a UE, a request to provide a physical layer report for a second base station, where the second base station is a base station in a dual-connectivity (DC) configuration, a deactivated base station in a CA configuration, or a non-serving base station of the UE and receiving, via a physical layer message from the UE, the physical layer report for the second base station.

An apparatus for wireless communication at a first base station is described. The apparatus may include a processor, memory in electronic communication with the processor, and instructions stored in the memory. The instructions may be executable by the processor to cause the apparatus to transmit, to a UE, a request to provide a physical layer report for a second base station, where the second base station is a base station in a DC configuration, a deactivated base station in a CA configuration, or a non-serving base station of the UE and receive, via a physical layer message from the UE, the physical layer report for the second base station.

Another apparatus for wireless communication at a first base station is described. The apparatus may include means for transmitting, to a UE, a request to provide a physical layer report for a second base station, where the second base station is a base station in a DC configuration, a deactivated base station in a CA configuration, or a non-serving base station of the UE and receiving, via a physical layer message from the UE, the physical layer report for the second base station.

A non-transitory computer-readable medium storing code for wireless communication at a first base station is described. The code may include instructions executable by a processor to transmit, to a UE, a request to provide a physical layer report for a second base station, where the second base station is a base station in a DC configuration, a deactivated base station in a CA configuration, or a non-serving base station of the UE and receive, via a physical layer message from the UE, the physical layer report for the second base station.

In some examples of the method, apparatuses, and non-transitory computer-readable medium described herein, the second base station may be the base station in the DC configuration.

Some examples of the method, apparatuses, and non-transitory computer-readable medium described herein may further include operations, features, means, or instructions for transmitting, from the first base station to the UE, an indication that the second base station may be added to the DC configuration prior to receiving the physical layer report.

Some examples of the method, apparatuses, and non-transitory computer-readable medium described herein may further include operations, features, means, or instructions for transmitting, from the first base station to the second base station, the physical layer report, receiving, at the first base station from the second base station, a random access channel configuration message for the second base station, where the random access channel configuration message may be based on the physical layer report and forwarding, from the first base station to the UE, the random access channel configuration message for the second base station.

Some examples of the method, apparatuses, and non-transitory computer-readable medium described herein may further include operations, features, means, or instructions for identifying a set of physical layer parameters for the UE to measure for the physical layer report, where the set of physical layer parameters may be associated with a set of transmissions by the second base station and including in the request to provide the physical layer report an indication of the set of physical layer parameters for the UE to measure.

Some examples of the method, apparatuses, and non-transitory computer-readable medium described herein may further include operations, features, means, or instructions for transmitting, from the first base station to the UE, a request to provide an RRC layer report for the second base station and receiving, via an RRC message from the UE, the RRC layer report for the second base station; where transmitting the request to provide the physical layer report for the second base station may be based on receiving the RRC layer report.

In some examples of the method, apparatuses, and non-transitory computer-readable medium described herein, the second base station may be the deactivated base station in the CA configuration. Some examples of the method, apparatuses, and non-transitory computer-readable medium described herein may further include operations, features, means, or instructions for transmitting a cell activation message to the UE based on the physical layer report, where the cell activation message indicates the second base station may be activated for communications.

In some examples of the method, apparatuses, and non-transitory computer-readable medium described herein, the second base station may be the non-serving base station of the UE. Some examples of the method, apparatuses, and non-transitory computer-readable medium described herein may further include operations, features, means, or instructions for transmitting an indication that the second base station may be added as a primary secondary base station.

DETAILED DESCRIPTION

Figure 1:
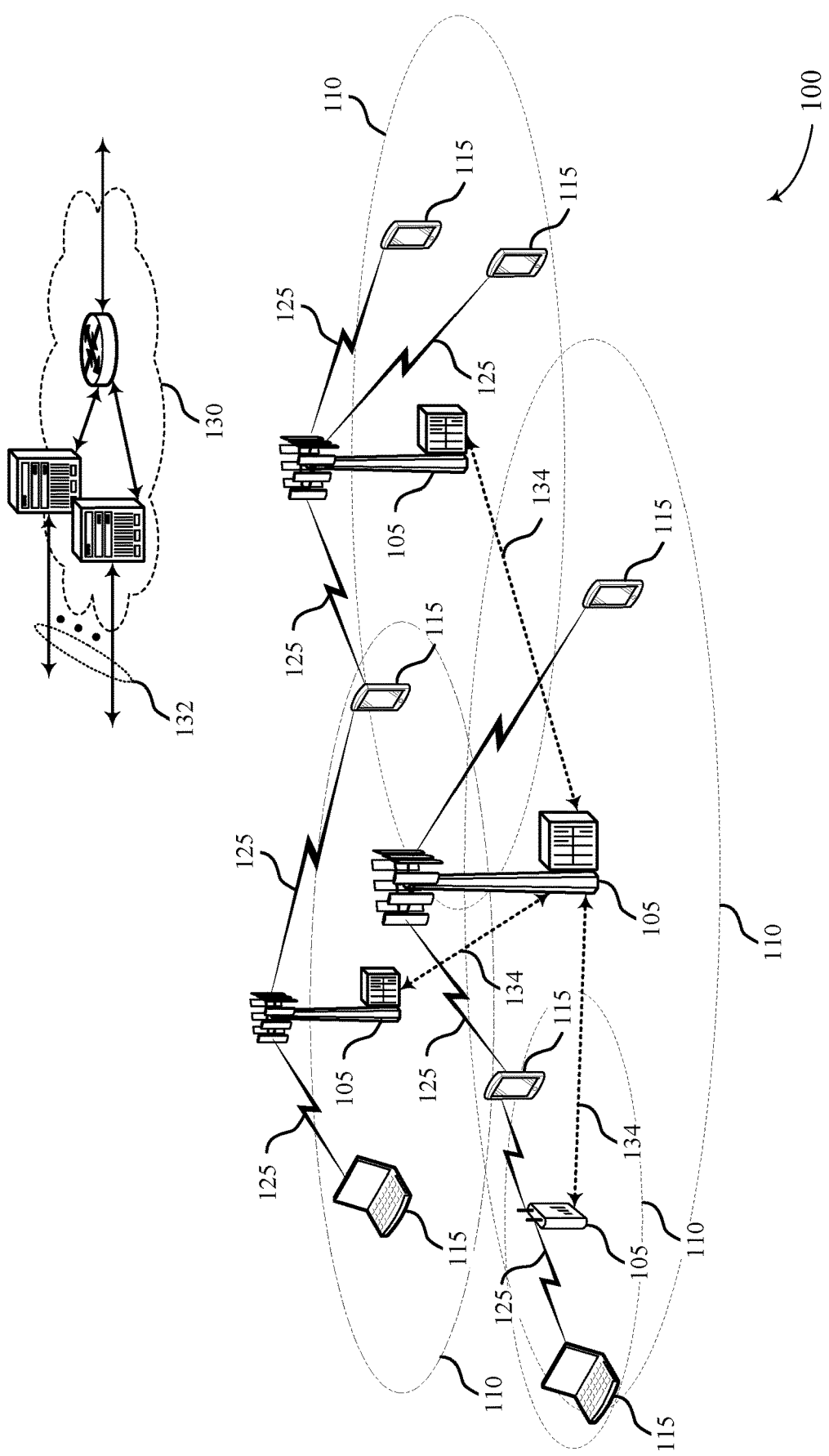
FIG. 1 illustrates an example of a wireless communication system that supports physical layer reporting by a UE in accordance with aspects of the present disclosure.

Some wireless communication systems may support one or more coordinated configurations in which base stations may coordinate with other base stations to communicate with user equipments (UEs) in the system. For example, in a dual connectivity (DC) configuration, a master base station may coordinate with a number of secondary base stations to communicate data to a UE. In a carrier aggregation (CA) configuration, a primary base station may coordinate with secondary base stations to provide multiple component carriers (CCs) for transmitting data to the UE.

In some coordinated configurations, a master or primary base station may determine other secondary base stations to provide coordinated communications to a UE. The master or primary base station may in some cases rely on a higher layer measurement report (e.g., a Radio Resource Configuration (RRC) layer, or layer 3 (L3) report) from a UE to determine whether to coordinate communications with a secondary base station. The higher layer measurement report may include parameters processed at a higher layer (e.g., an RRC layer) of the UE or filtered based on coefficients provided by the higher layer. However, such higher layer processing or filter coefficients may increase processing time duration (e.g., may involve the use of higher-layer coefficient filters over an extended period of time, for time-averaging purposes). Additionally, a higher layer report may be transmitted over higher layer messaging, which may result in a large transmission time duration. These larger processing and transmission times may increase latency within a coordinated configuration.

Generally, aspects of the described techniques provide for a mechanism where a UE may provide a lower layer measurement report (e.g., a physical layer, or layer 1 (L1) report), corresponding measurements of a second base station (which may be, for example, in a DC configuration, in a CA configuration, or may be a non-serving base station), to a first base station (e.g., to determine whether to coordinate communications with the second base station) in various network configurations. A first base station may transmit a request to provide a physical layer report from a UE. The UE may perform measurements on transmissions from a second base station. The UE may perform all tasks related to the physical layer report at the physical layer of the UE. For example, measuring, generating, and transmitting (e.g., over an uplink control channel) of the physical layer report may all be performed at the physical layer of the UE. As all tasks related to the physical layer report may avoid being performed by a higher layer of the UE, the physical layer report may provide a shortened processing time and a shortened transmission time.

Aspects of the disclosure are initially described in the context of a wireless communications system. Aspects of the disclosure are then illustrated in the context of process flow diagrams. Aspects of the disclosure are further illustrated by and described with reference to apparatus diagrams, system diagrams, and flowcharts that relate to physical layer reporting by a UE.

FIG. 1 illustrates an example of a wireless communications system 100 that supports physical layer reporting by a UE in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As described herein, a first base station 105 may transmit a request for a UE 115 to provide a physical layer report (e.g., an L1 report, L3 report, etc.) for a second base station 105. The second base station 105 may be a base station of the DC configuration, a deactivated base station of the CA configuration (e.g., upon data arrival, the first base station 105 may schedule A-CSI-RS for deactivated second base station 105), or a non-serving base station of the UE 115. The UE 115 may measure transmissions of the second base station 105 and generate, at the physical layer of the UE 115, a physical layer report based on the measurements. The UE 115 may transmit the physical layer report to the first base station 105.

Figure 2:
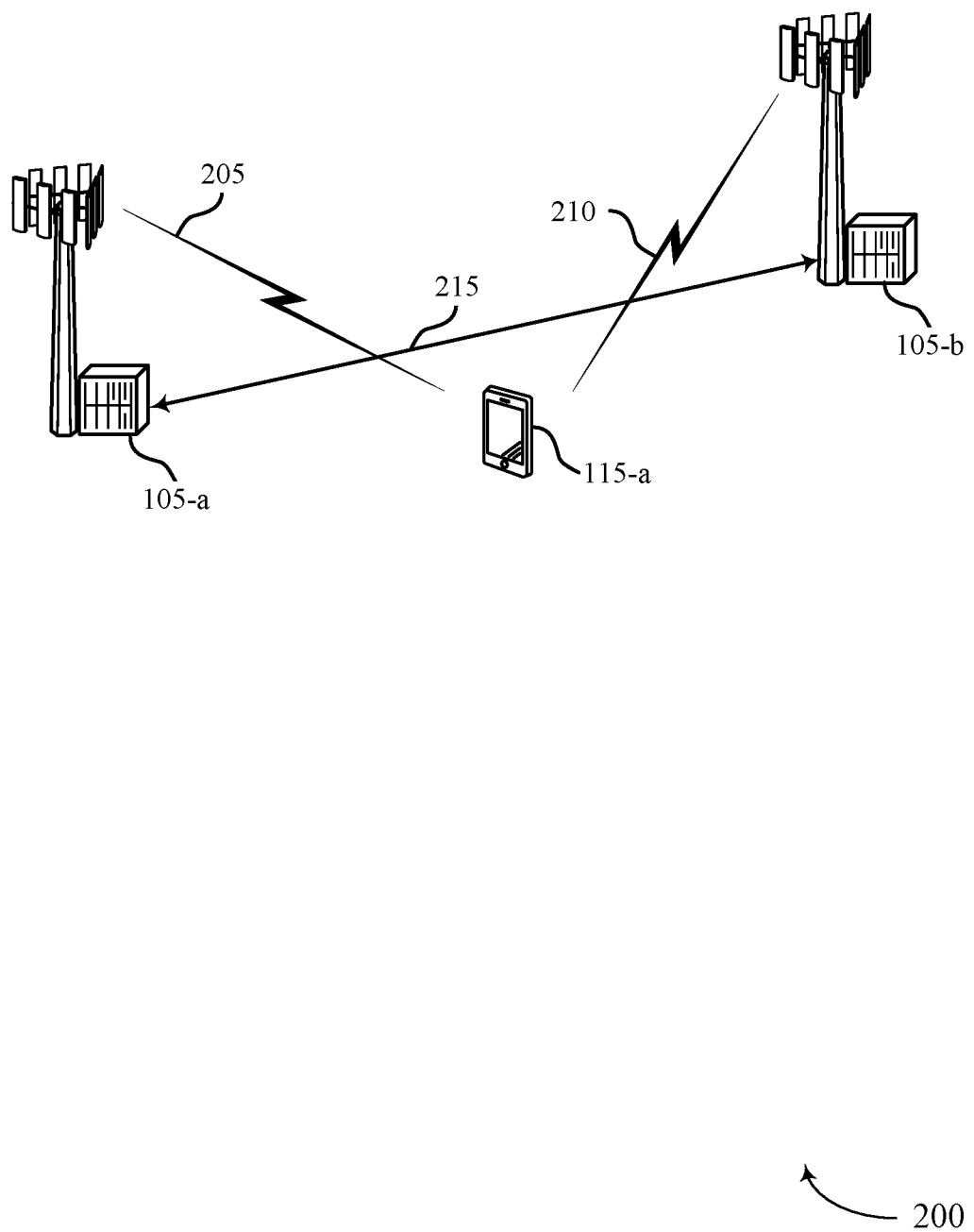
FIG. 2 illustrates an example of a wireless communication system that supports physical layer reporting by a UE in accordance with aspects of the present disclosure.

FIG. 2 illustrates an example of a wireless communication system 200 that supports physical layer reporting by a UE in accordance with aspects of the present disclosure. In some examples, wireless communication system 200 may be implemented by aspects of wireless communication system 100. Wireless communications system 200 may include a base station 105-a, base station 105-b, and a UE 115-a. In some cases, both base station 105-a and base station 105-b may be NR gNBs, UE 115 may communicate with base station 105 using link 205 and communicate with base station 105-b using link 210, and UE 115 may be in an NR-to-NR DC mode. In other examples, wireless communications system 200 may support CA communications, where base station 105-a, base station 105-b, or both transmit communications over multiple CCs to UE 115-a. In other examples, base station 105-a may be a serving base station 105 for UE 115-a, and base station 105-b may (at least at the time of physical layer reporting by UE 115-a) be a non-serving base station 105.

Base station 105-a may attempt to coordinate transmissions to UE 115-a with base station 105-b (e.g., via link 225 and link 230). In some examples, base station 105-a may not be currently implementing coordinated communications with base station 105-b. For example, base station 105-b may be a neighboring base station that does not serve UE 115-a. In another example, base station 105-b may be a deactivated base station in a CA configuration, such that base station 105-b is deactivated from communicating with UE 115-a. In yet another example, base station 105-b may be a base station that may or may not already be added to a DC configuration with base station 105-a.

Base station 105-a may request UE 115-a to provide a physical layer report (e.g., L1 report) corresponding to measurements of transmissions from base station 105-b. Base station 105-a may rely on the physical layer report to determine whether coordinated communications with base station 105-b is possible, advantageous, etc. For example, in a CA configuration, base station 105-a may rely on the physical layer report to determine whether to activate base station 105-b for communicating with UE 115-a. In another example, if base station 105-b is a neighboring base station, base station 105-a may rely on the physical layer report to determine whether to add (e.g., configure) base station 105-b to a DC configuration. In another example, in a DC configuration where base station 105-b is already added, base station 105-a may rely on the physical layer report to determine whether to coordinate communications with base station 105-b to carry scheduled data to UE 115-a. In some cases, the physical layer report may be bundled with a cell configuration message.

In some cases, base station 105-a may request a higher layer report (e.g., an L3 report) from UE 115-b prior to requesting the physical layer report. Base station 105-a may request the higher layer report prior to reception of data by base station 105-a to be transmitted to UE 115-a. UE 115-a may measure transmissions from one or more base stations 105 based on the received higher layer report. UE 115-a may generate the higher layer report at a higher layer (e.g., RRC layer) of UE 115-a, and may transmit the higher layer report via the higher layer to base station 105-a. In some cases, base station 105-a may transmit the request for a physical layer report based on the higher layer report.

The request to provide the physical layer report may provide information related to transmissions of base station 105-b. In some cases, the received request may indicate a measurement window for UE 115-a to measure one or multiple transmissions from base station 105-b. Additionally or alternatively, the received request may indicate a set of parameters for UE 115-a to measure and/or report on. The indicated parameters may include: a cell identifier (ID), a reference signal type, a reference signal ID, a channel state information reference signal (CSI-RS) resource ID, a synchronization signal block (SSB) index, a rank indicator, a precoding matric index, a channel quality indicator (CQI), a reference signal receive power (RSRP), or a combination thereof. In some cases, the request may indicate for UE 115-a to measure transmissions from multiple base stations 105 in system 200, where UE 115-a transmits a physical layer report on only a subset of the measured base stations 105 (e.g., report on base station 105 with highest transmission power for SSBs).

Actions by UE 115-a corresponding to the requested physical layer report may be performed at the physical layer of UE 115-a. UE 115-a may measure transmissions from base station 105-b based on the request to provide a physical layer report from base station 105-a. The transmissions may include A-CSI-RS or SSBs. The measurements may be performed at a physical layer (e.g., Layer 1) of UE 115-a. Furthermore, processing of the measurements may be performed at the physical layer of the UE 115-a as well. Since processing the measurements may avoid higher layer processors of UE 115-a, a processing time for the physical layer report may be reduced in comparison to high layer processes.

UE 115-a may transmit the physical layer report to base station 105-a. UE 115-a may transmit the physical layer report over a physical layer channel (e.g., PUCCH) which may include a shorter transmission time as compared to higher layer transmissions. Base station 105-a may determine whether to coordinate communications with base station 105-b based on the physical layer report. If base station 105-a determines to coordinate transmissions, base station 105-a may transmit an indication to UE 115-a indicating the coordinated communications with base station 105-b (e.g., transmitting a cell addition message to UE 115-b, transmitting a random access configuration message to UE 115-a, transmitting a cell activation message to UE 115-a, etc.).

In some cases, base station 105-a may forward the physical layer report to base station 105-b. Base station 105-a may then receive a random access channel configuration in response to the physical layer report. In some cases, random access channel configuration may be CSI-RS based. Base station 105-a may forward the random access channel configuration to UE 115-a which may use the random access channel configuration to perform a random access channel procedure with base station 105-b. UE 115-a may measure CSI-RSs as part of UE measurements of base station 105-b transmissions. UE 115-a may select a random access channel occasion of a set of occasions based on the measured CSI-RSs. The random access channel occasion may be used by base station 105-b to transmit a random access channel preamble.

Figure 3:
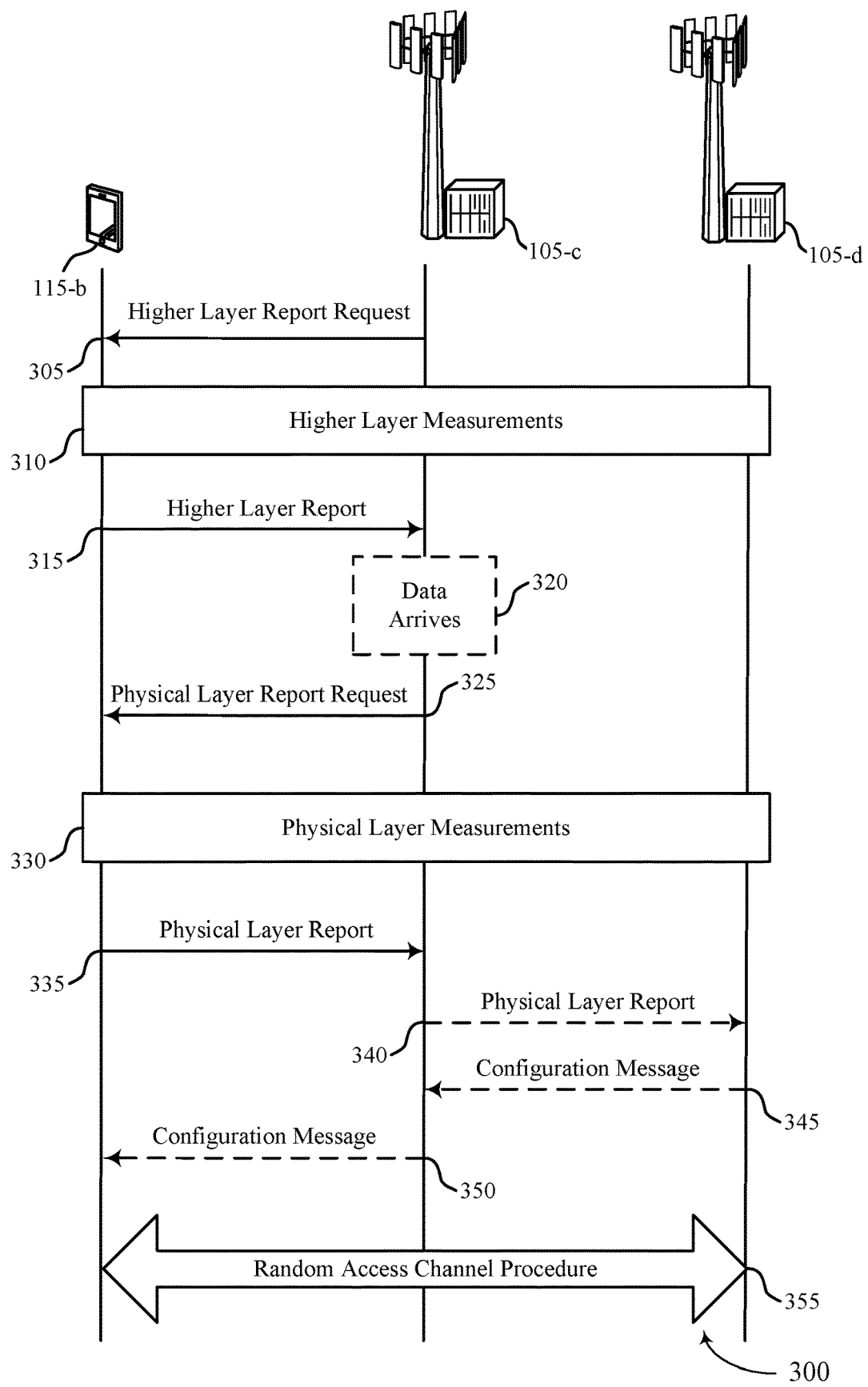
FIG. 3 illustrates an example of a process flow that supports physical layer reporting by a UE in accordance with aspects of the present disclosure.

FIG. 3 illustrates an example of a process flow 300 that supports physical layer reporting by a UE in accordance with aspects of the present disclosure. In some examples, process flow 300 may be implemented by aspects of wireless communication system 100 or wireless communication system 200. Process flow 300 may include a UE 115-b, base station 105-c, and base station 105-d, which may be examples of UE 115 and base station 105 described with reference to FIGS. 1 and 2. In some cases, base station 105-c and base station 105-d may be activated and configured base stations of a DC configuration.

In some cases, one or more operations of process flow 300 may be performed in different orders or at different times. Further, in some cases, certain operations may be left out of process flow 300, or other operations may be added to process flow 300.

At 305, base station 105-c may transmit, and UE 115-b may receive, a request for a higher layer (e.g., RRC layer) report request. At 310, UE 115-b may measure transmissions from base station 105-d based on the higher layer request. At 315, UE 115-b may transmit a higher layer report to base station 105-c based on the measurements.

In some cases, at 320, data may arrive at base station 105-c to be scheduled for transmission to UE 115-b. At 325, base station 105-c may transmit, and UE 115-b may receive, a physical layer report request. At 330, UE 115-b may measure transmissions of base station 105-d at the physical layer of UE 115-b. At 335, UE 115-b may transmit, and base station 105-c may receive, the physical layer report.

Base station 105-c may determine to coordinate communications with base station 105-d to carry scheduled data to UE 115-b. In some cases, at 340, base station 105-c may forward the physical layer report to base station 105-d. In some cases, at 345, base station 105-d may transmit, and base station 105-c may receive, a configuration message for a random access channel (RACH) procedure coverage enhancement (e.g., a CSI-RS based RACH configuration message, dedicated RACH resources for SSBs, etc.). In some cases, at 350, base station 105-c may forward the configuration message to UE 115-b. At 355, UE 115-b and base station 105-d may perform a random access channel procedure. In some cases, the random access channel procedure may be based on the configuration message.

Figure 4:
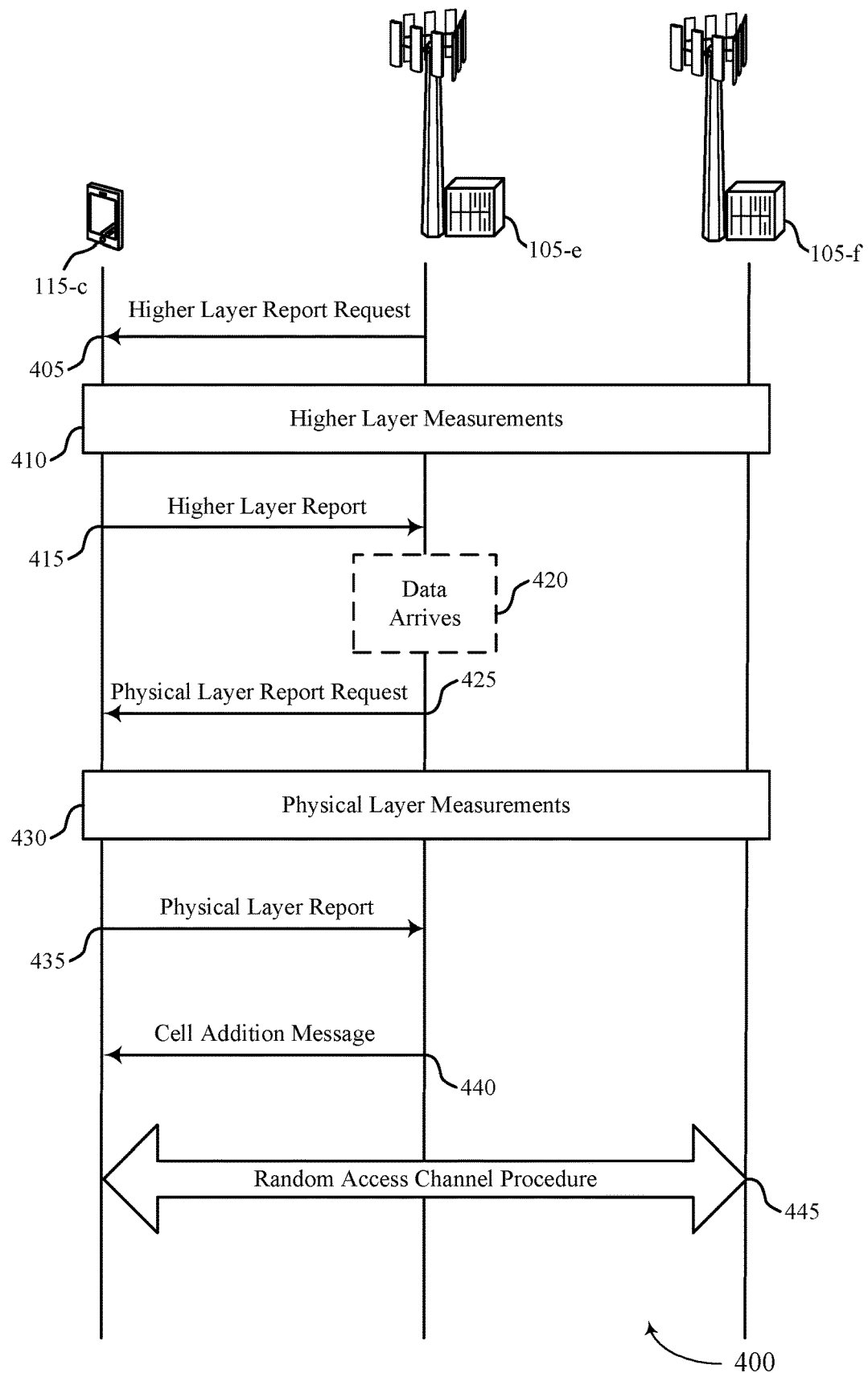
FIG. 4 illustrates an example of a process flow that supports physical layer reporting by a UE in accordance with aspects of the present disclosure.

FIG. 4 illustrates an example of a process flow 400 that supports physical layer reporting by a UE in accordance with aspects of the present disclosure. In some examples, process flow 400 may be implemented by aspects of wireless communication system 100 or wireless communication system 200. Process flow 400 may include UE 115-c, base station 105-e, and base station 105-f, which may be examples of UE 115 and base station 105 as described with reference to FIGS. 1 and 2. In some cases, base station 105-e may be a serving base station for UE 115-c, and base station 105-f may be a non-serving (e.g., neighboring) for UE 115-c. For example, in some cases, base station 105-e may be an activated and configured base station in a dual connectivity configuration, and base station 105-f may be an active but not configured base station of the dual connectivity configuration.

In some cases, one or more operations of process flow 400 may be performed in different orders or at different times. Further, in some cases, certain operations may be left out of process flow 400, or other operations may be added to process flow 400.

At 405, base station 105-e may transmit, and UE 115-c may receive, a request for a higher layer (e.g., RRC layer) report request. At 410, UE 115-c may measure transmissions from base station 105-f based on the higher layer request. At 415, UE 115-c may transmit a higher layer report to base station 105-e based on the measurements.

In some cases, at 420, data may arrive at base station 105-e to be scheduled for transmission to UE 115-c. At 425, base station 105-e may transmit, and UE 115-c may receive, a physical layer report request. At 430, UE 115-c may measure transmissions of base station 105-f at the physical layer of UE 115-c. At 435, UE 115-c may transmit, and base station 105-c may receive, the physical layer report.

Base station 105-e may determine to coordinate communications with base station 105-f to carry scheduled data to UE 115-c. At 440, base station 105-e may transmit, and UE 115-c may receive, a cell addition message indicating base station 105-f has been added to the DC configuration. At 445, UE 115-c and base station 105-f may perform a random access channel procedure. The random access channel procedure may be based on the cell addition message from base station 105-e.

Figure 5:
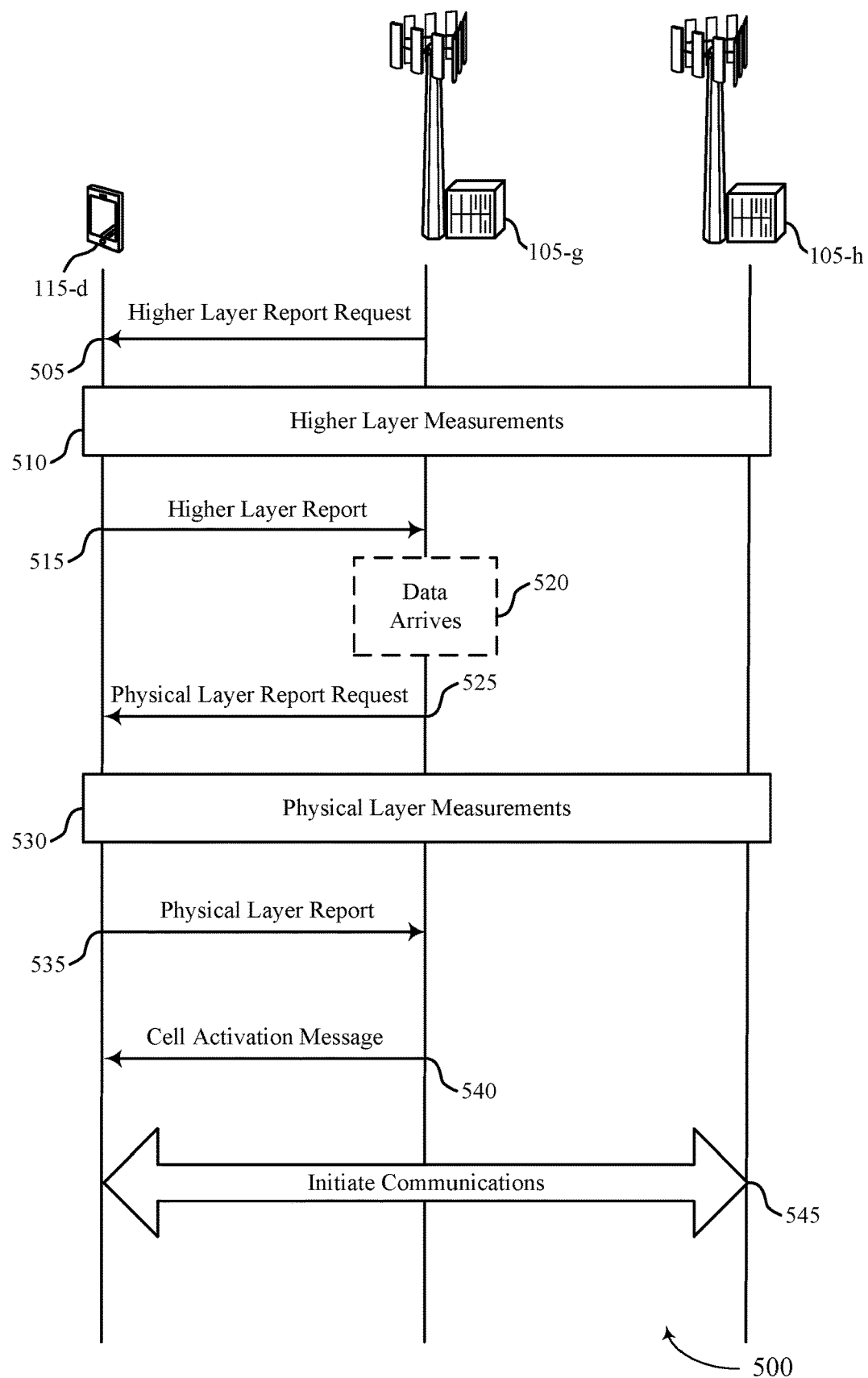
FIG. 5 illustrates an example of a process flow that supports physical layer reporting by a UE in accordance with aspects of the present disclosure.

FIG. 5 illustrates an example of a process flow 500 that supports physical layer reporting by a UE in accordance with aspects of the present disclosure. In some examples, process flow 500 may be implemented by aspects of wireless communication system 100 or wireless communication system 200. Process flow 500 may include a UE 115-c, base station 105-g, and base station 105-h, which may be examples of UE 115 and base station 105 as described with reference to FIGS. 1 and 2. In some cases, base station 105-g may be an activated and configured base station in a carrier aggregation configuration, and base station 105-h may be a deactivated and configured base station in the carrier aggregation configuration.

At 505, base station 105-g may transmit, and UE 115-d may receive, a request for a higher layer (e.g., RRC layer) report request. At 510, UE 115-d may measure transmissions from base station 105-h based on the higher layer request. At 515, UE 115-d may transmit a higher layer report to base station 105-g based on the measurements.

In some cases, at 520, data may arrive at base station 105-g to be scheduled for transmission to UE 115-d. At 525, base station 105-g may transmit, and UE 115-d may receive, a physical layer report request. At 530, UE 115-d may measure transmissions of base station 105-h at the physical layer of UE 115-d. At 535, UE 115-d may transmit, and base station 105-g may receive, the physical layer report.

At 540, base station 105-g may transmit, and UE 115-c may receive, a cell activation message. The cell activation message may indicate that base station 105-h may be activated to communicate with UE 115-*c*, and may be transmitted based at least in part on the physical layer report. At 545, UE 115-*c* and base station 105-*h* may initiate communications based on the cell activation message.

Figure 6:
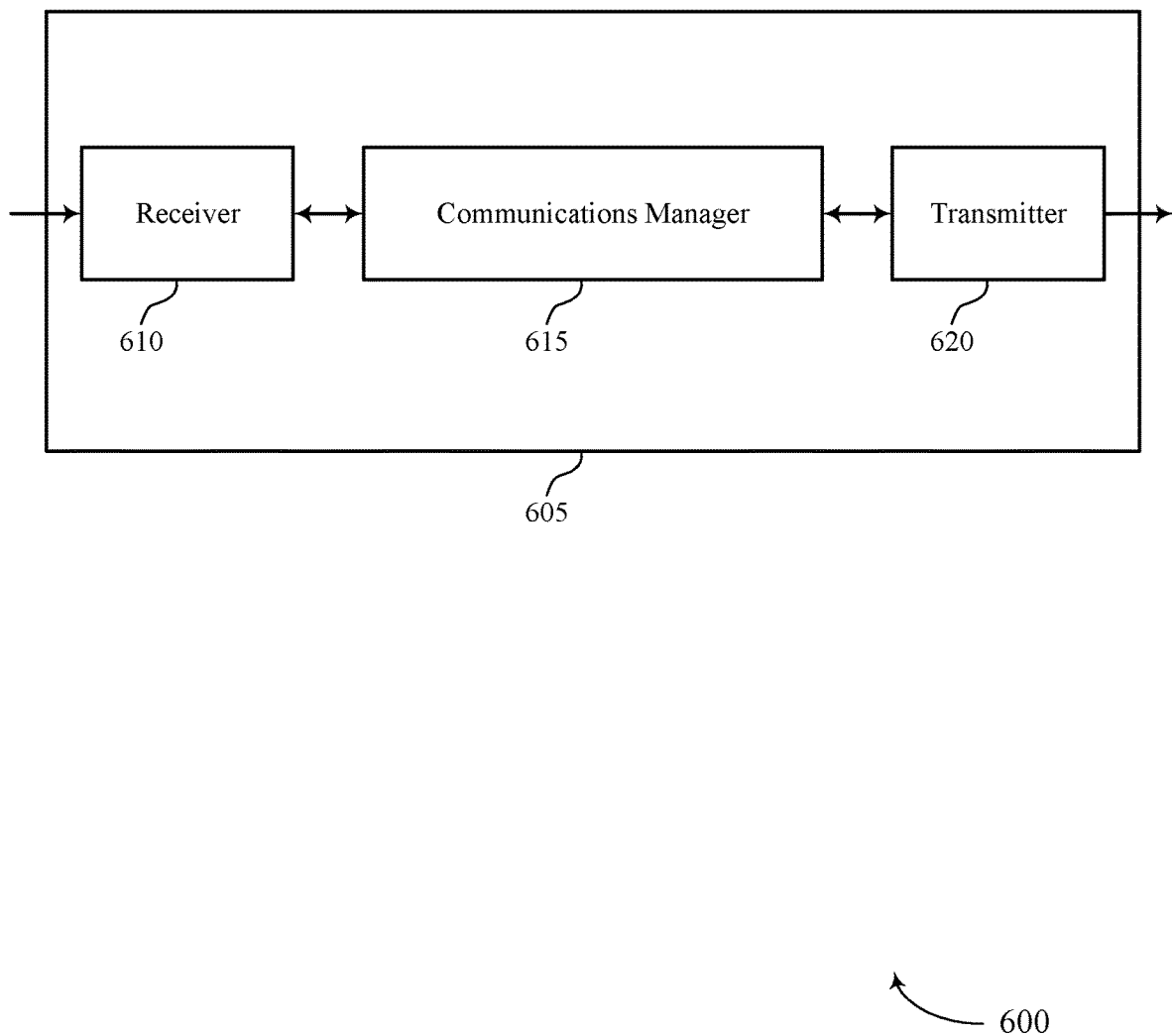
FIGS. 6 and 7 show block diagrams of devices that support physical layer reporting by a UE in accordance with aspects of the present disclosure.

FIG. 6 shows a block diagram 600 of a device 605 that supports physical layer reporting by a UE in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to physical layer reporting by a UE, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a first base station, a request to provide a physical layer report for a second base station, where the second base station is a base station in a dual-connectivity (DC) configuration, a deactivated base station in a carrier aggregation (CA) configuration, or a non-serving base station of the UE, measure a set of physical layer parameters associated with a set of transmissions from the second base station, the measuring based on the request, generate the physical layer report based on the measured set of parameters, and transmit, via a physical layer message, the physical layer report to the first base station in response to the request. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
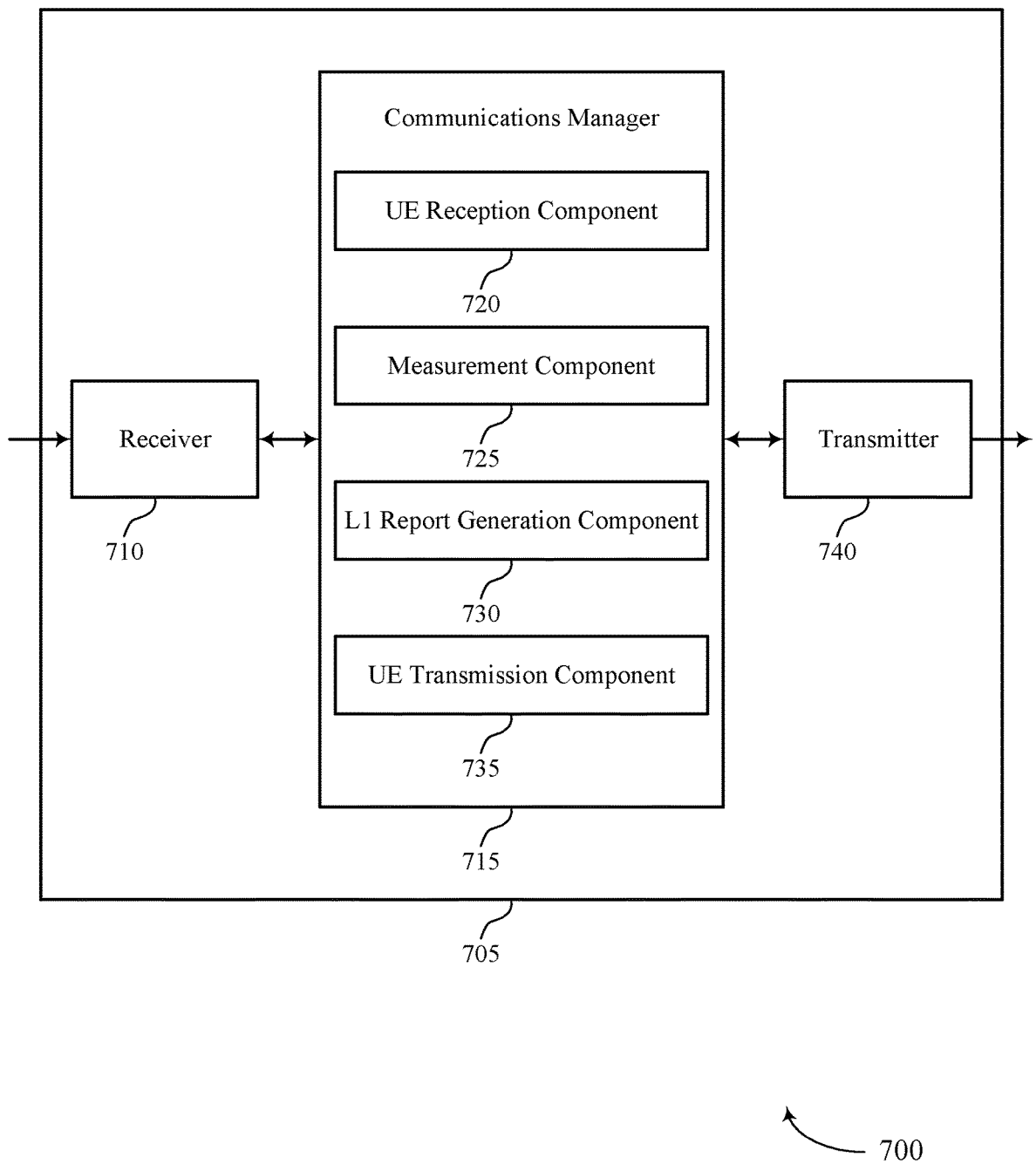

FIG. 7 shows a block diagram 700 of a device 705 that supports physical layer reporting by a UE in accordance with aspects of the present disclosure. The device 705 may be an example of aspects of a device 605 or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to physical layer reporting by a UE, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a UE reception component 720, a measurement component 725, a L1 report generation component 730, and a UE transmission component 735. The communications manager 715 may be an example of aspects of the communications manager 910 described herein.

The UE reception component 720 may receive, from a first base station, a request to provide a physical layer report for a second base station, where the second base station is a base station in a dual-connectivity (DC) configuration, a deactivated base station in a carrier aggregation (CA) configuration, or a non-serving base station of the UE.

The measurement component 725 may measure a set of physical layer parameters associated with a set of transmissions from the second base station, the measuring based on the request.

The L1 report generation component 730 may generate the physical layer report based on the measured set of parameters.

The UE transmission component 735 may transmit, via a physical layer message, the physical layer report to the first base station in response to the request.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
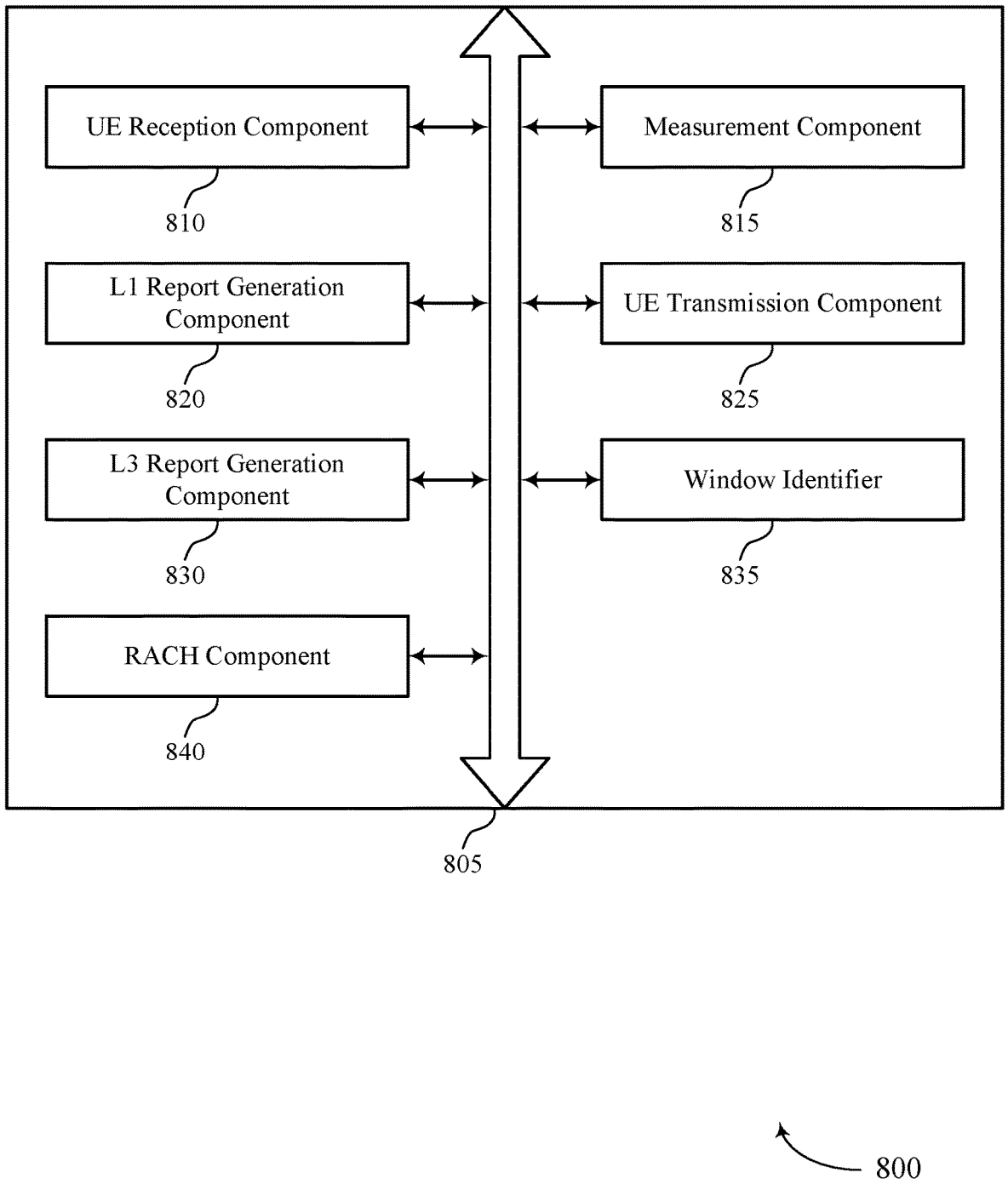
FIG. 8 shows a block diagram of a communications manager that supports physical layer reporting by a UE in accordance with aspects of the present disclosure.

FIG. 8 shows a block diagram 800 of a communications manager 805 that supports physical layer reporting by a UE in accordance with aspects of the present disclosure. The communications manager 805 may be an example of aspects of a communications manager 615, a communications manager 715, or a communications manager 910 described herein. The communications manager 805 may include a UE reception component 810, a measurement component 815, a L1 report generation component 820, a UE transmission component 825, a L3 report generation component 830, a window identifier 835, and a RACH component 840. Each of these modules may communicate, directly or indirectly, with one another (e.g., via one or more buses).

The UE reception component 810 may receive, from a first base station, a request to provide a physical layer report for a second base station. In some cases, the second base station is in a DC configuration with the first base station. In some cases, the second base station is a deactivated base station in a CA configuration. In some cases, the second base station is a non-serving base station of the UE.

In some examples, the UE reception component 810 may receive, from the first base station, a request to provide an RRC layer report for the second base station.

In some examples, the UE reception component 810 may receive, from the first base station, an indication that the second base station is added to the DC configuration prior to measuring the set of physical layer parameters.

In some examples, the UE reception component 810 may receive a random access configuration message from the first base station based on the physical layer report.

In some examples, the UE reception component 810 may receive a cell activation message from the first base station based on the physical layer report, where the cell activation message indicates the second base station is activated for communications.

In some examples, the UE reception component 810 may communicate with the second base station based a t least in part on the cell activation message.

In some examples, the UE reception component 810 may receive, from the first base station, an indication that the second base station is added as a primary secondary base station.

The measurement component 815 may measure a set of physical layer parameters associated with a set of transmissions from the second base station, the measuring based on the request.

In some examples, the measurement component 815 may measure another set of parameters associated with another set of transmissions from the second base station. In some cases, the set of transmissions from the second base station includes one or more synchronization signal blocks (SSBs). In some cases, the set of transmissions from the second base station includes one or more aperiodic channel state information (A-CSI) reference signals (A-CSI-RS).

The L1 report generation component 820 may generate the physical layer report based on the measured set of parameters. In some cases, the physical layer report includes information on a measured cell identifier (ID), a reference signal type, a reference signal ID, a CSI reference signal (CSI-RS) resource ID, a synchronization signal index, a rank indicator, a precoding matrix index, a channel quality indicator (CQI), a reference signal receive power (RSRP), or a combination thereof.

The UE transmission component 825 may transmit, via a physical layer message, the physical layer report to the first base station in response to the request. In some examples, the UE transmission component 825 may transmit, via an RRC message, the RRC layer report to the first base station in response to the request to provide the RRC layer report for the second base station, where receiving the request to provide the physical layer report for the second base station is based on transmitting the RRC layer report.

The L3 report generation component 830 may generate the RRC layer report based on the measured another set of parameters.

The window identifier 835 may identify a window for measuring the set of transmissions from the second base station based on the request to provide the physical layer report for the second base station.

The RACH component 840 may perform a random access channel procedure with the second base station based on the random access configuration message. In some examples, the RACH component 840 may perform a random access channel procedure with the second base station based on the indication.

Figure 9:
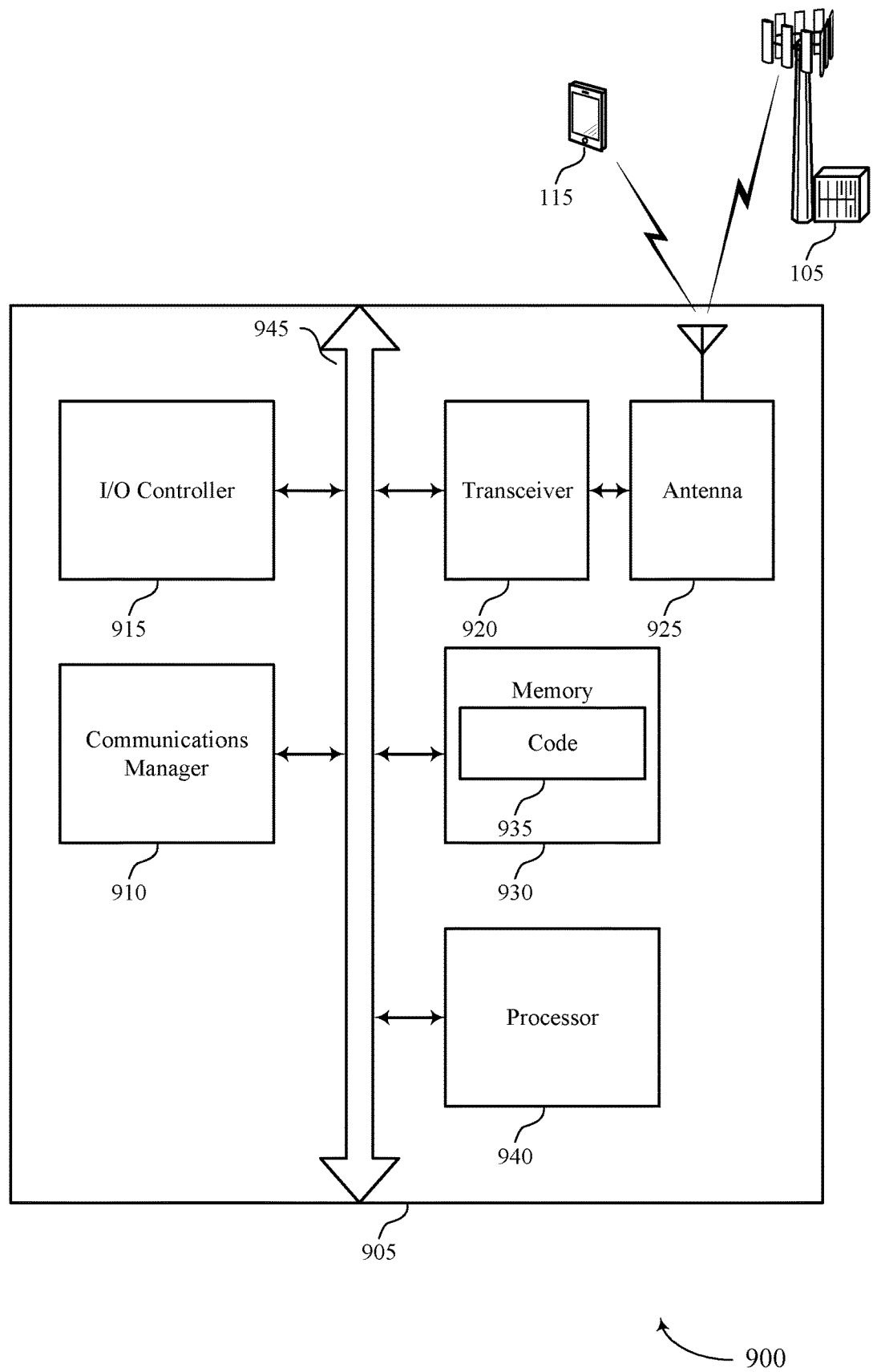
FIG. 9 shows a diagram of a system including a device that supports physical layer reporting by a UE in accordance with aspects of the present disclosure.

FIG. 9 shows a diagram of a system 900 including a device 905 that supports physical layer reporting by a UE in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a first base station, a request to provide a physical layer report for a second base station, where the second base station is a base station in a dual-connectivity (DC) configuration, a deactivated base station in a carrier aggregation (CA) configuration, or a non-serving base station of the UE, measure a set of physical layer parameters associated with a set of transmissions from the second base station, the measuring based on the request, generate the physical layer report based on the measured set of parameters, and transmit, via a physical layer message, the physical layer report to the first base station in response to the request.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting physical layer reporting by a UE).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
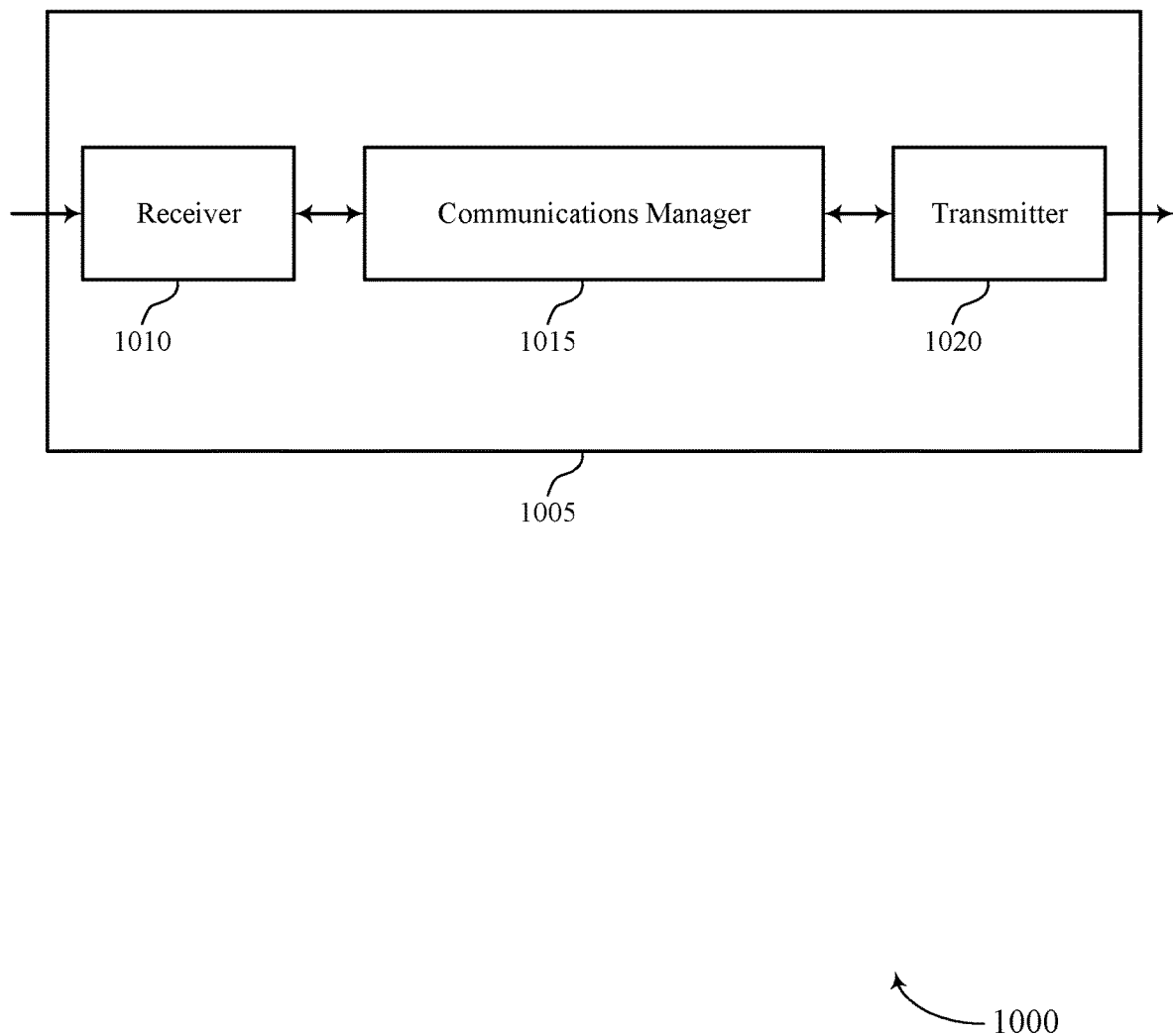
FIGS. 10 and 11 show block diagrams of devices that support physical layer reporting by a UE in accordance with aspects of the present disclosure.

FIG. 10 shows a block diagram 1000 of a device 1005 that supports physical layer reporting by a UE in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to physical layer reporting by a UE, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a request to provide a physical layer report for a second base station, where the second base station is a base station in a dual-connectivity (DC) configuration, a deactivated base station in a carrier aggregation (CA) configuration, or a non-serving base station of the UE and receive, via a physical layer message from the UE, the physical layer report for the second base station. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
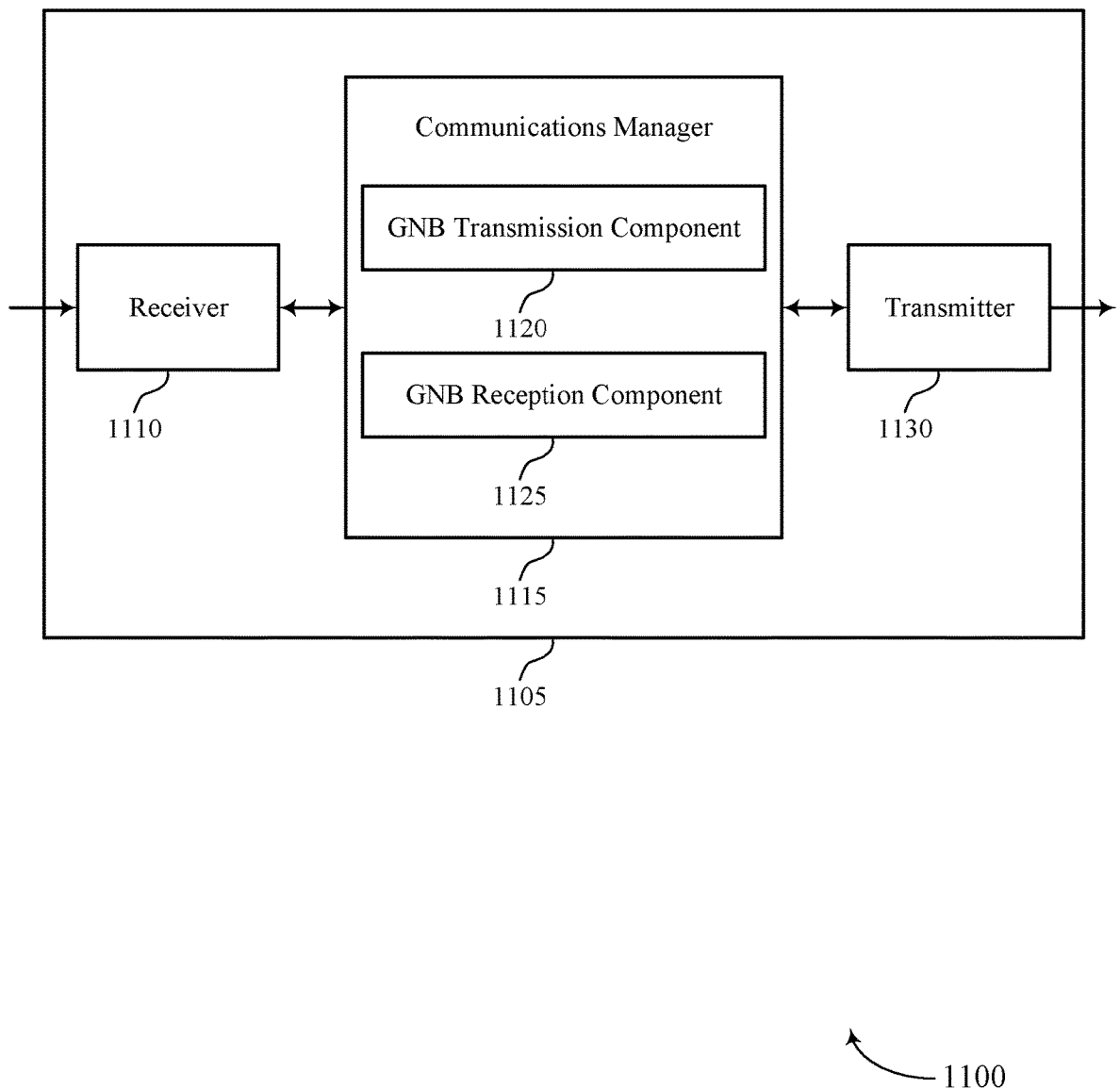

FIG. 11 shows a block diagram 1100 of a device 1105 that supports physical layer reporting by a UE in accordance with aspects of the present disclosure. The device 1105 may be an example of aspects of a device 1005 or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to physical layer reporting by a UE, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a gNB transmission component 1120 and a gNB reception component 1125. The communications manager 1115 may be an example of aspects of the communications manager 1310 described herein.

The gNB transmission component 1120 may transmit, to a UE, a request to provide a physical layer report for a second base station, where the second base station is a base station in a dual-connectivity (DC) configuration, a deactivated base station in a carrier aggregation (CA) configuration, or a non-serving base station of the UE.

The gNB reception component 1125 may receive, via a physical layer message from the UE, the physical layer report for the second base station.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
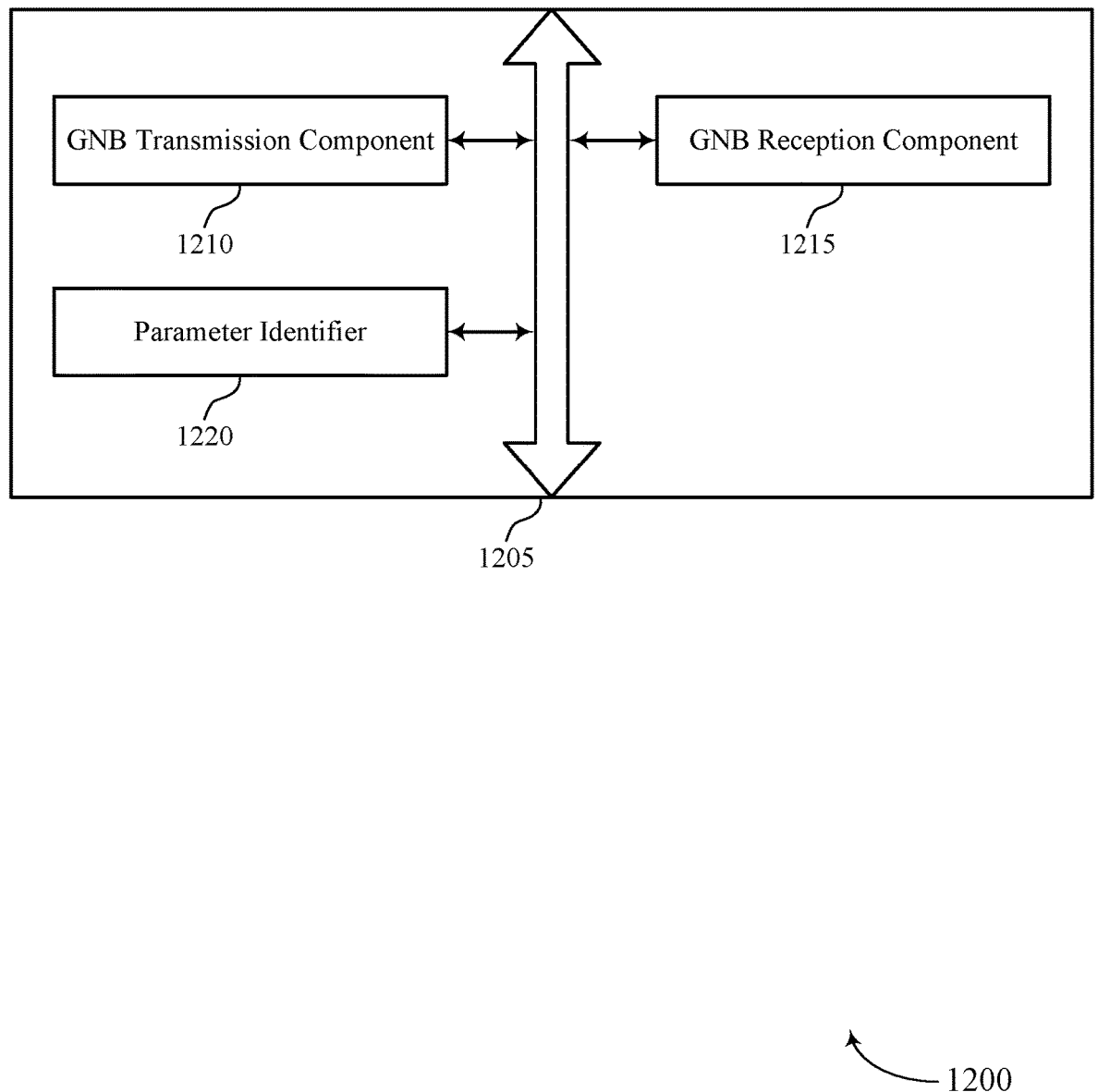
FIG. 12 shows a block diagram of a communications manager that supports physical layer reporting by a UE in accordance with aspects of the present disclosure.

FIG. 12 shows a block diagram 1200 of a communications manager 1205 that supports physical layer reporting by a UE in accordance with aspects of the present disclosure. The communications manager 1205 may be an example of aspects of a communications manager 1015, a communications manager 1115, or a communications manager 1310 described herein. The communications manager 1205 may include a gNB transmission component 1210, a gNB reception component 1215, and a parameter identifier 1220. Each of these modules may communicate, directly or indirectly, with one another (e.g., via one or more buses).

The gNB transmission component 1210 may transmit, to a UE, a request to provide a physical layer report for a second base station. In some cases, the second base station is in a DC configuration with the first base station. In some cases, the second base station is a deactivated base station in a CA configuration. In some cases, the second base station is a non-serving base station of the UE.

In some examples, the gNB transmission component 1210 may transmit, from the first base station to the UE, an indication that the second base station is added to the dual connectivity configuration prior to receiving the physical layer report.

In some examples, the gNB transmission component 1210 may transmit, from the first base station to the second base station, the physical layer report.

In some examples, the gNB transmission component 1210 may forward, from the first base station to the UE, the random access channel configuration message for the second base station.

In some examples, the gNB transmission component 1210 may include in the request to provide the physical layer report an indication of the set of physical layer parameters for the UE to measure.

In some examples, the gNB transmission component 1210 may transmit, from the first base station to the UE, a request to provide an RRC layer report for the second base station.

In some examples, the gNB transmission component 1210 may transmit a cell activation message to the UE based on the physical layer report, where the cell activation message indicates the second base station is activated for communications.

In some examples, the gNB transmission component 1210 may transmit an indication that the second base station is added as a primary secondary base station.

The gNB reception component 1215 may receive, via a physical layer message from the UE, the physical layer report for the second base station.

In some examples, the gNB reception component 1215 may receive, at the first base station from the second base station, a random access channel configuration message for the second base station, where the random access channel configuration message is based on the physical layer report.

In some examples, the gNB reception component 1215 may receive, via an RRC message from the UE, the RRC layer report for the second base station; where transmitting the request to provide the physical layer report for the second base station is based on receiving the RRC layer report.

The parameter identifier 1220 may identify a set of physical layer parameters for the UE to measure for the physical layer report, where the set of physical layer parameters are associated with a set of transmissions by the second base station.

Figure 13:
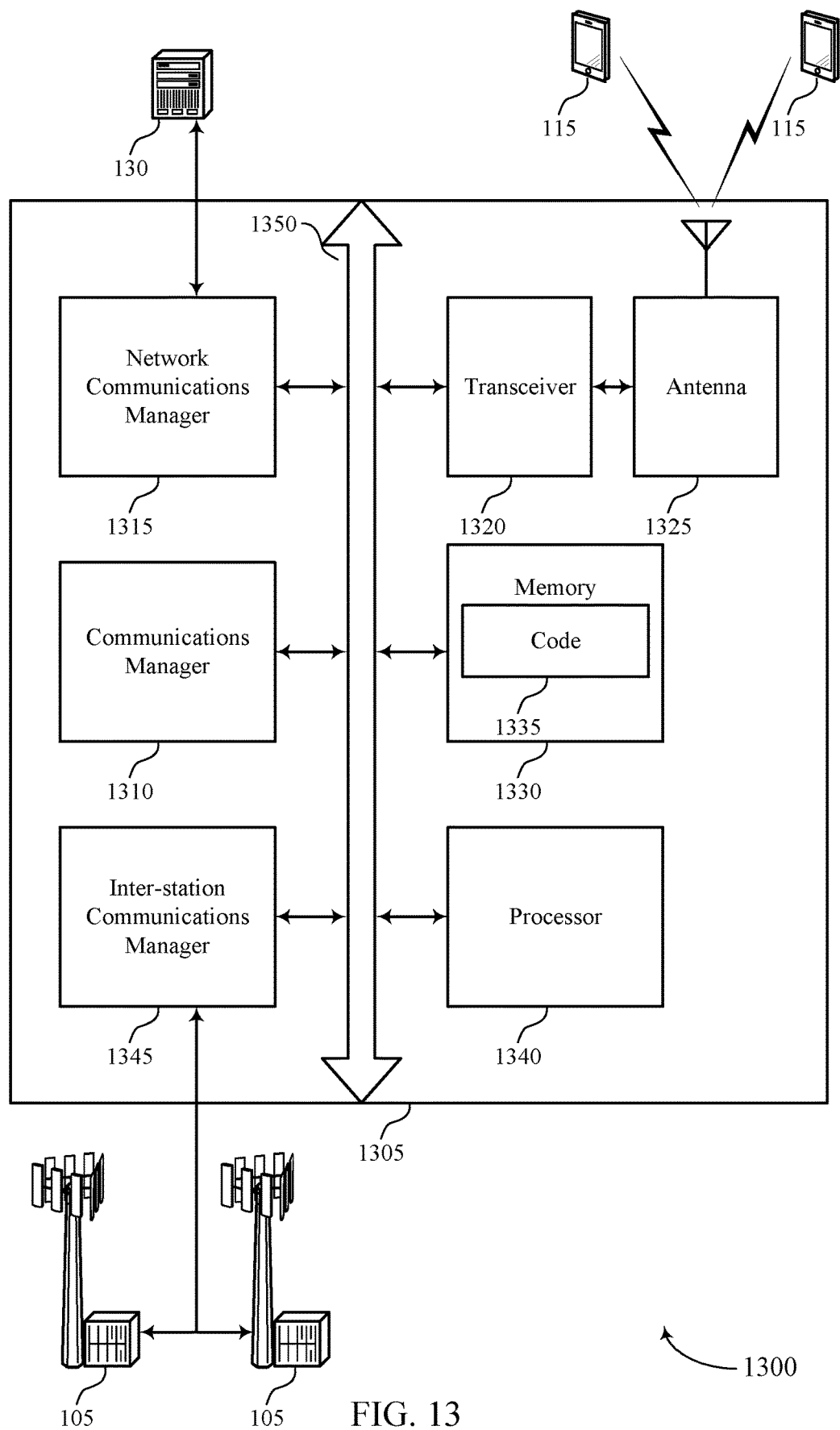
FIG. 13 shows a diagram of a system including a device that supports physical layer reporting by a UE in accordance with aspects of the present disclosure.

FIG. 13 shows a diagram of a system 1300 including a device 1305 that supports physical layer reporting by a UE in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a request to provide a physical layer report for a second base station, where the second base station is a base station in a dual-connectivity (DC) configuration, a deactivated base station in a carrier aggregation (CA) configuration, or a non-serving base station of the UE and receive, via a physical layer message from the UE, the physical layer report for the second base station.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the memory controller to perform various functions (e.g., functions or tasks supporting physical layer reporting by a UE).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
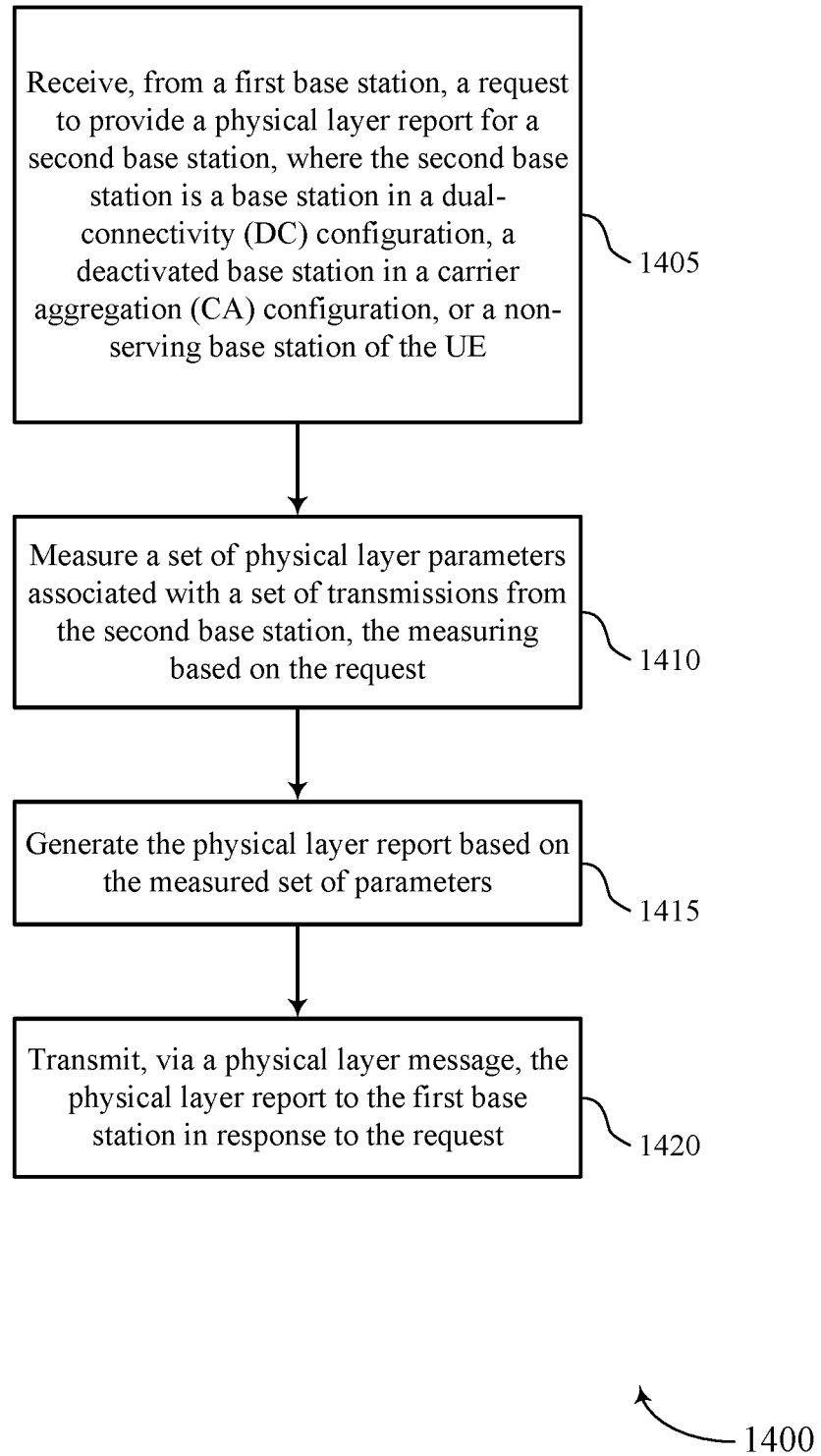
FIGS. 14 through 18 show flowcharts illustrating methods that support physical layer reporting by a UE in accordance with aspects of the present disclosure.

FIG. 14 shows a flowchart illustrating a method 1400 that supports physical layer reporting by a UE in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a first base station, a request to provide a physical layer report for a second base station, where the second base station is a base station in a dual-connectivity (DC) configuration, a deactivated base station in a carrier aggregation (CA) configuration, or a non-serving base station of the UE. The operations of 1405 may be performed according to the methods described herein. In some examples, aspects of the operations of 1405 may be performed by a UE reception component as described with reference to FIGS. 6 through 9.

At 1410, the UE may measure a set of physical layer parameters associated with a set of transmissions from the second base station, the measuring based on the request. The operations of 1410 may be performed according to the methods described herein. In some examples, aspects of the operations of 1410 may be performed by a measurement component as described with reference to FIGS. 6 through 9.

At 1415, the UE may generate the physical layer report based on the measured set of parameters. The operations of 1415 may be performed according to the methods described herein. In some examples, aspects of the operations of 1415 may be performed by a L1 report generation component as described with reference to FIGS. 6 through 9.

At 1420, the UE may transmit, via a physical layer message, the physical layer report to the first base station in response to the request. The operations of 1420 may be performed according to the methods described herein. In some examples, aspects of the operations of 1420 may be performed by a UE transmission component as described with reference to FIGS. 6 through 9.

Figure 15:
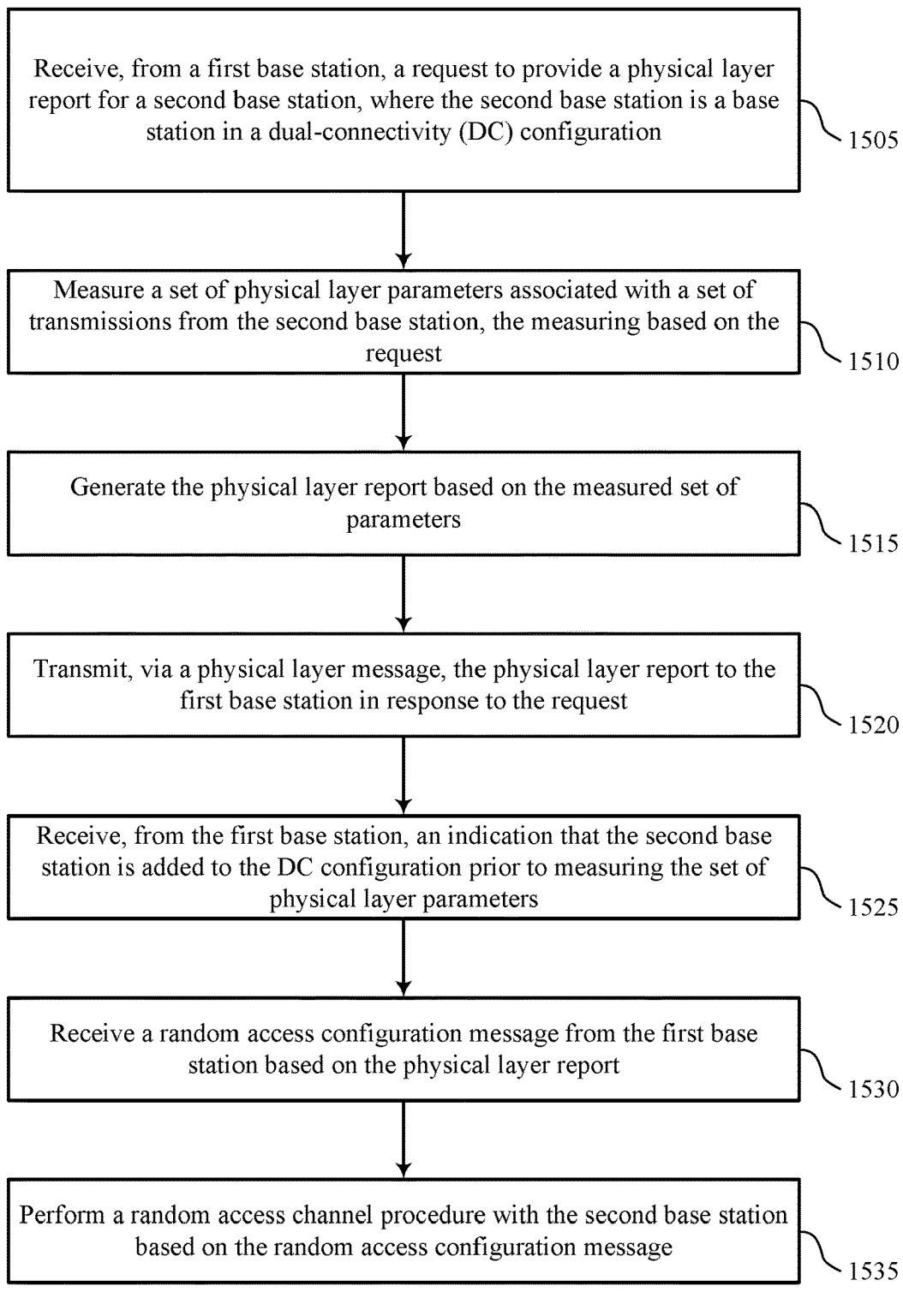

FIG. 15 shows a flowchart illustrating a method 1500 that supports physical layer reporting by a UE in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a first base station, a request to provide a physical layer report for a second base station, where the second base station is a base station in a dual-connectivity (DC) configuration. The operations of 1505 may be performed according to the methods described herein. In some examples, aspects of the operations of 1505 may be performed by a UE reception component as described with reference to FIGS. 6 through 9.

At 1510, the UE may measure a set of physical layer parameters associated with a set of transmissions from the second base station, the measuring based on the request. The operations of 1510 may be performed according to the methods described herein. In some examples, aspects of the operations of 1510 may be performed by a measurement component as described with reference to FIGS. 6 through 9.

At 1515, the UE may generate the physical layer report based on the measured set of parameters. The operations of 1515 may be performed according to the methods described herein. In some examples, aspects of the operations of 1515 may be performed by a L1 report generation component as described with reference to FIGS. 6 through 9.

At 1520, the UE may transmit, via a physical layer message, the physical layer report to the first base station in response to the request. The operations of 1520 may be performed according to the methods described herein. In some examples, aspects of the operations of 1520 may be performed by a UE transmission component as described with reference to FIGS. 6 through 9.

At 1525, the UE may receive, from the first base station, an indication that the second base station is added to the DC configuration prior to measuring the set of physical layer parameters. The operations of 1525 may be performed according to the methods described herein. In some examples, aspects of the operations of 1525 may be performed by a UE reception component as described with reference to FIGS. 6 through 9.

At 1530, the UE may receive a random access configuration message from the first base station based on the physical layer report. The operations of 1530 may be performed according to the methods described herein. In some examples, aspects of the operations of 1530 may be performed by a UE reception component as described with reference to FIGS. 6 through 9.

At 1535, the UE may perform a random access channel procedure with the second base station based on the random access configuration message. The operations of 1535 may be performed according to the methods described herein. In some examples, aspects of the operations of 1535 may be performed by a RACH component as described with reference to FIGS. 6 through 9.

Figure 16:
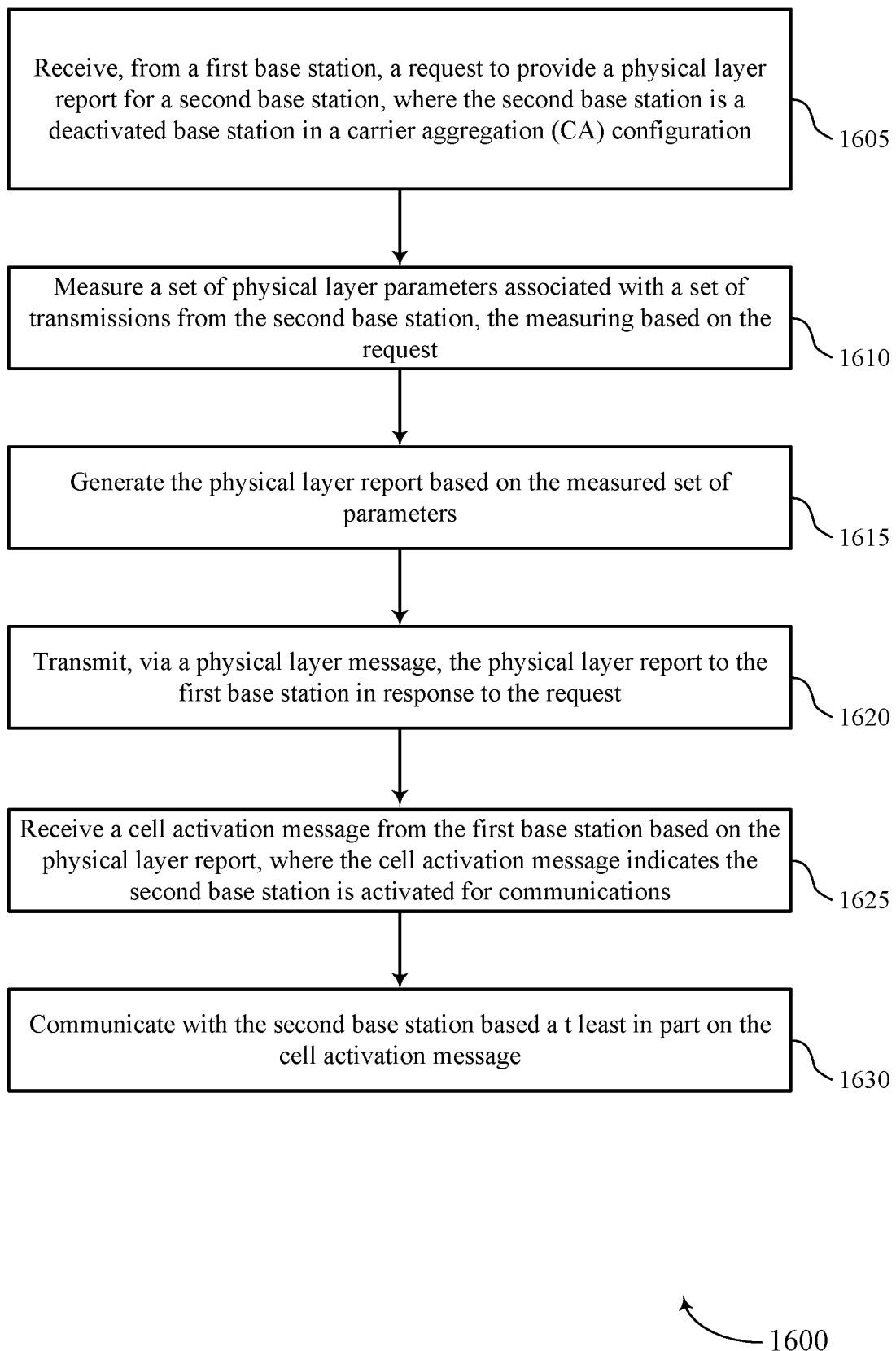

FIG. 16 shows a flowchart illustrating a method 1600 that supports physical layer reporting by a UE in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a first base station, a request to provide a physical layer report for a second base station, where the second base station is a deactivated base station in a carrier aggregation (CA) configuration. The operations of 1605 may be performed according to the methods described herein. In some examples, aspects of the operations of 1605 may be performed by a UE reception component as described with reference to FIGS. 6 through 9.

At 1610, the UE may measure a set of physical layer parameters associated with a set of transmissions from the second base station, the measuring based on the request. The operations of 1610 may be performed according to the methods described herein. In some examples, aspects of the operations of 1610 may be performed by a measurement component as described with reference to FIGS. 6 through 9.

At 1615, the UE may generate the physical layer report based on the measured set of parameters. The operations of 1615 may be performed according to the methods described herein. In some examples, aspects of the operations of 1615 may be performed by a L1 report generation component as described with reference to FIGS. 6 through 9.

At 1620, the UE may transmit, via a physical layer message, the physical layer report to the first base station in response to the request. The operations of 1620 may be performed according to the methods described herein. In some examples, aspects of the operations of 1620 may be performed by a UE transmission component as described with reference to FIGS. 6 through 9.

At 1625, the UE may receive a cell activation message from the first base station based on the physical layer report, where the cell activation message indicates the second base station is activated for communications. The operations of 1625 may be performed according to the methods described herein. In some examples, aspects of the operations of 1625 may be performed by a UE reception component as described with reference to FIGS. 6 through 9.

At 1630, the UE may communicate with the second base station based a t least in part on the cell activation message. The operations of 1630 may be performed according to the methods described herein. In some examples, aspects of the operations of 1630 may be performed by a UE reception component as described with reference to FIGS. 6 through 9.

Figure 17:
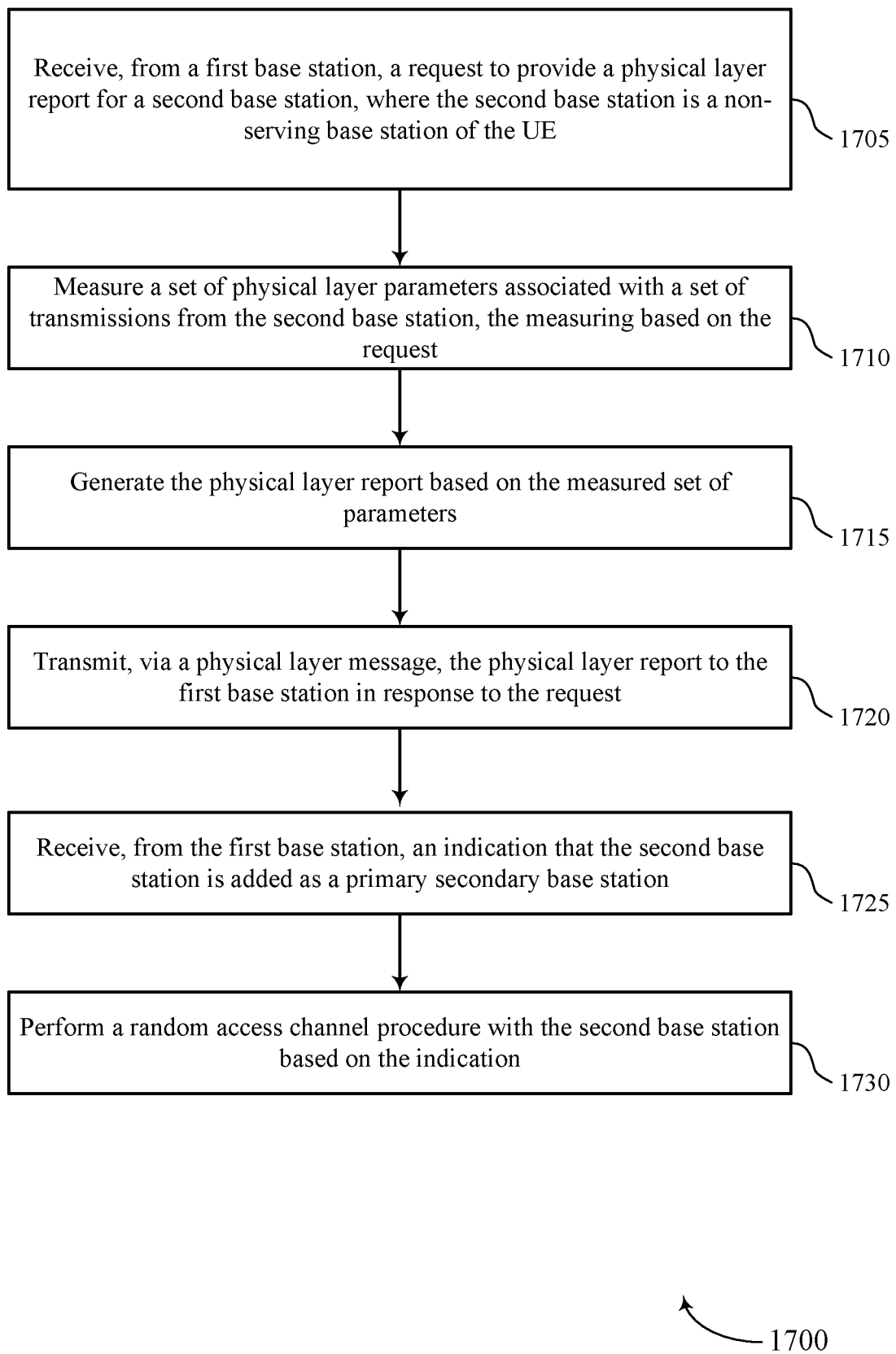

FIG. 17 shows a flowchart illustrating a method 1700 that supports physical layer reporting by a UE in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a first base station, a request to provide a physical layer report for a second base station, where the second base station is a non-serving base station of the UE. The operations of 1705 may be performed according to the methods described herein. In some examples, aspects of the operations of 1705 may be performed by a UE reception component as described with reference to FIGS. 6 through 9.

At 1710, the UE may measure a set of physical layer parameters associated with a set of transmissions from the second base station, the measuring based on the request. The operations of 1710 may be performed according to the methods described herein. In some examples, aspects of the operations of 1710 may be performed by a measurement component as described with reference to FIGS. 6 through 9.

At 1715, the UE may generate the physical layer report based on the measured set of parameters. The operations of 1715 may be performed according to the methods described herein. In some examples, aspects of the operations of 1715 may be performed by a L1 report generation component as described with reference to FIGS. 6 through 9.

At 1720, the UE may transmit, via a physical layer message, the physical layer report to the first base station in response to the request. The operations of 1720 may be performed according to the methods described herein. In some examples, aspects of the operations of 1720 may be performed by a UE transmission component as described with reference to FIGS. 6 through 9.

At 1725, the UE may receive, from the first base station, an indication that the second base station is added as a primary secondary base station. The operations of 1725 may be performed according to the methods described herein. In some examples, aspects of the operations of 1725 may be performed by a UE reception component as described with reference to FIGS. 6 through 9.

At 1730, the UE may perform a random access channel procedure with the second base station based on the indication. The operations of 1730 may be performed according to the methods described herein. In some examples, aspects of the operations of 1730 may be performed by a RACH component as described with reference to FIGS. 6 through 9.

Figure 18:
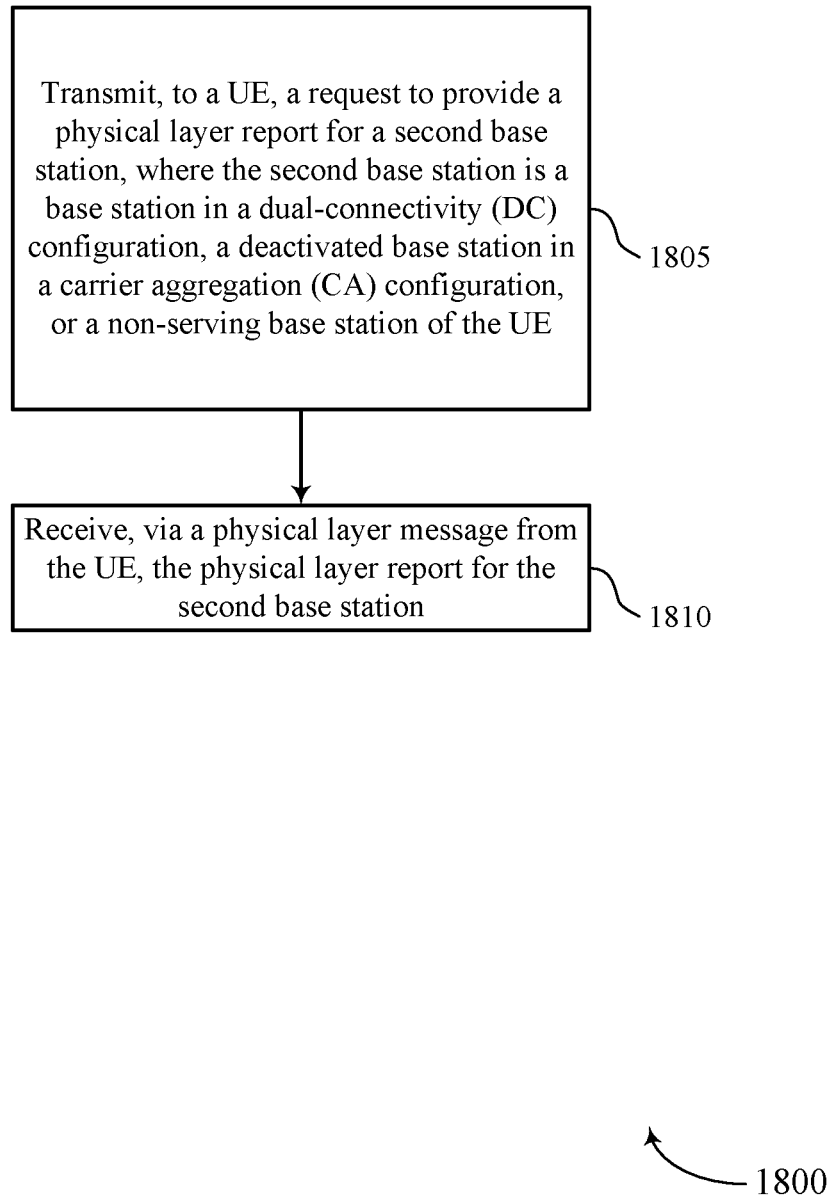

FIG. 18 shows a flowchart illustrating a method 1800 that supports physical layer reporting by a UE in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a UE, a request to provide a physical layer report for a second base station, where the second base station is a base station in a dual-connectivity (DC) configuration, a deactivated base station in a carrier aggregation (CA) configuration, or a non-serving base station of the UE. The operations of 1805 may be performed according to the methods described herein. In some examples, aspects of the operations of 1805 may be performed by a gNB transmission component as described with reference to FIGS. 10 through 13.

At 1810, the base station may receive, via a physical layer message from the UE, the physical layer report for the second base station. The operations of 1810 may be performed according to the methods described herein. In some examples, aspects of the operations of 1810 may be performed by a gNB reception component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a first base station, a request to provide a radio resource control (RRC) layer report for a second base station different from the first base station;
    transmitting, via an RRC message and to the first base station, the RRC layer report for the second base station in response to the request to provide the RRC layer report;
    receiving, from the first base station and based at least in part on transmitting the RRC layer report, a request to provide a physical layer report for the second base station, wherein the second base station is a base station in a dual-connectivity (DC) configuration, a deactivated base station in a carrier aggregation (CA) configuration, or a non-serving base station of the UE;
    measuring a set of physical layer parameters associated with a set of transmissions from the second base station, the measuring based at least in part on the request to provide the physical layer report;
    generating the physical layer report based at least in part on the measured set of physical layer parameters; and
    transmitting, via a physical layer message, the physical layer report to the first base station in response to the request to provide the physical layer report.

2. The method of claim 1, further comprising:
    measuring another set of parameters associated with another set of transmissions from the second base station; and
    generating the RRC layer report based at least in part on the measured another set of parameters.

3. The method of claim 1, further comprising:
    identifying a window for measuring the set of transmissions from the second base station based at least in part on the request to provide the physical layer report for the second base station.

4. The method of claim 1, wherein the physical layer report includes information on a measured cell identifier (ID), a reference signal type, a reference signal ID, a channel state information (CSI) reference signal (CSI-RS) resource ID, a synchronization signal index, a rank indicator, a precoding matrix index, a channel quality indicator (CQI), a reference signal receive power (RSRP), or a combination thereof.

5. The method of claim 1, wherein the second base station is the base station in the DC configuration.

6. The method of claim 1, wherein the set of transmissions from the second base station comprises one or more synchronization signal blocks (SSBs).

7. The method of claim 5, further comprising:
    receiving, from the first base station, an indication that the second base station is added to the DC configuration prior to measuring the set of physical layer parameters.

8. The method of claim 5, further comprising:
    receiving a random access configuration message from the first base station based at least in part on the physical layer report.

9. The method of claim 8, further comprising:
    performing a random access channel procedure with the second base station based at least in part on the random access configuration message.

10. The method of claim 1, wherein the second base station is the deactivated base station in the CA configuration.

11. The method of claim 10, wherein the set of transmissions from the second base station comprises one or more aperiodic channel state information (A-CSI) reference signals (A-CSI-RS).

12. The method of claim 10, further comprising:
    receiving a cell activation message from the first base station based on the physical layer report, wherein the cell activation message indicates the second base station is activated for communications.

13. The method of claim 12, further comprising:
    communicating with the second base station based at least in part on the cell activation message.

14. The method of claim 1, wherein the second base station is the non-serving base station of the UE.

15. The method of claim 14, further comprising:
    receiving, from the first base station, an indication that the second base station is added as a primary secondary base station.

16. The method of claim 15, further comprising:
    performing a random access channel procedure with the second base station based at least in part on the indication.

17. A method for wireless communication at a first base station, comprising:
    transmitting, to a user equipment (UE), a request to provide a radio resource control (RRC) layer report for a second base station different from the first base station;
    receiving, via an RRC message from the UE, the RRC layer report for the second base station in response to the request to provide the RRC layer report;
    transmitting, to the UE, a request to provide a physical layer report for the second base station based at least in part on receiving the RRC layer report, wherein the second base station is a base station in a dual-connectivity (DC) configuration, a deactivated base station in a carrier aggregation (CA) configuration, or a non-serving base station of the UE; and receiving, via a physical layer message from the UE, the physical layer report for the second base station.

18. The method of claim 17, wherein the second base station is the base station in the DC configuration.

19. The method of claim 18, further comprising:
transmitting, from the first base station to the UE, an indication that the second base station is added to the DC configuration prior to receiving the physical layer report.

20. The method of claim 18, further comprising:
transmitting, from the first base station to the second base station, the physical layer report;
receiving, at the first base station from the second base station, a random access channel configuration message for the second base station, wherein the random access channel configuration message is based at least in part on the physical layer report; and
forwarding, from the first base station to the UE, the random access channel configuration message for the second base station.

21. The method of claim 17, further comprising:
identifying a set of physical layer parameters for the UE to measure for the physical layer report, wherein the set of physical layer parameters are associated with a set of transmissions by the second base station; and
including in the request to provide the physical layer report an indication of the set of physical layer parameters for the UE to measure.

22. The method of claim 17, wherein the second base station is the deactivated base station in the CA configuration.

23. The method of claim 22, further comprising:
transmitting a cell activation message to the UE based on the physical layer report, wherein the cell activation message indicates the second base station is activated for communications.

24. The method of claim 17, wherein the second base station is the non-serving base station of the UE.

25. The method of claim 24, further comprising:
transmitting an indication that the second base station is added as a primary secondary base station.

26. An apparatus for wireless communication at a user equipment (UE), comprising:
a processor,
memory in electronic communication with the processor; and
instructions stored in the memory and executable by the processor to cause the apparatus to:
receive, from a first base station, a request to provide a radio resource control (RRC) layer report for a second base station different from the first base station;
transmit, via an RRC message and to the first base station, the RRC layer report for the second base station in response to the request to provide the RRC layer report;
receive, from the first base station and based at least in part on transmitting the RRC layer report, a request to provide a physical layer report for the second base station, wherein the second base station is a base station in a dual-connectivity (DC) configuration, a deactivated base station in a carrier aggregation (CA) configuration, or a non-serving base station of the UE;
measure a set of physical layer parameters associated with a set of transmissions from the second base station, the measuring based at least in part on the request to provide the physical layer report;
generate the physical layer report based at least in part on the measured set of physical layer parameters; and
transmit, via a physical layer message, the physical layer report to the first base station in response to the request to provide the physical layer report.

27. The apparatus of claim 26, wherein the second base station is the deactivated base station in the CA configuration.

28. The apparatus of claim 26, wherein the set of transmissions from the second base station comprises one or more aperiodic channel state information (A-CSI) reference signals (A-CSI-RS).

29. An apparatus for wireless communication at a first base station, comprising:
a processor,
memory in electronic communication with the processor; and
instructions stored in the memory and executable by the processor to cause the apparatus to:
transmit, to a user equipment (UE), a request to provide a radio resource control (RRC) layer report for a second base station different from the first base station;
receive, via an RRC message from the UE, the RRC layer report for the second base station in response to the request to provide the RRC layer report;
transmit, to the UE, a request to provide a physical layer report for the second base station based at least in part on receiving the RRC layer report, wherein the second base station is a base station in a dual-connectivity (DC) configuration, a deactivated base station in a carrier aggregation (CA) configuration, or a non-serving base station of the UE; and
receive, via a physical layer message from the UE, the physical layer report for the second base station.

* * * * *